(12) United States Patent
Hwang et al.

(10) Patent No.: US 11,910,463 B2
(45) Date of Patent: Feb. 20, 2024

(54) METHOD AND APPARATUS FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Seunggye Hwang, Seoul (KR); Youngdae Lee, Seoul (KR); Jaehyung Kim, Seoul (KR); Hyunsoo Ko, Seoul (KR); Inkwon Seo, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/951,041

(22) Filed: Sep. 22, 2022

(65) Prior Publication Data
US 2023/0032154 A1 Feb. 2, 2023

Related U.S. Application Data

(63) Continuation of application No. PCT/KR2021/010458, filed on Aug. 9, 2021.

(30) Foreign Application Priority Data

Aug. 7, 2020 (KR) .................. 10-2020-0099126
May 26, 2021 (KR) .................. 10-2021-0067827

(51) Int. Cl.
*H04W 76/20* (2018.01)
*H04L 5/00* (2006.01)
*H04W 68/00* (2009.01)

(52) U.S. Cl.
CPC ........... *H04W 76/20* (2018.02); *H04L 5/0051* (2013.01); *H04W 68/005* (2013.01)

(58) Field of Classification Search
CPC .... H04W 76/20; H04W 68/005; H04L 5/0051
See application file for complete search history.

(56) References Cited

U.S. PATENT DOCUMENTS

| 10,470,049 B2* | 11/2019 | Lee ..................... H04L 1/0026 |
| 2016/0249350 A1* | 8/2016 | Koutsimanis ......... H04W 16/14 |
| 2019/0349902 A1* | 11/2019 | Soriaga ................ H04W 72/23 |

(Continued)

FOREIGN PATENT DOCUMENTS

| CN | 110690947 | 1/2020 |
| WO | 2019029711 | 2/2019 |
| WO | 2019095331 | 5/2019 |

OTHER PUBLICATIONS

PCT International Application No. PCT/KR2021/010458, International Search Report dated Nov. 29, 2021, 3 pages.

(Continued)

*Primary Examiner* — Parth Patel
(74) *Attorney, Agent, or Firm* — LEE, HONG, DEGERMAN, KANG & WAIMEY

(57) ABSTRACT

User equipment according to an embodiment of the present invention may obtain a configuration of a reference signal for an RRC idle mode or an RRC inactive mode, determine the availability of the configured reference signal, and receive the reference signal in the RRC idle mode or the RRC inactive mode.

14 Claims, 14 Drawing Sheets

(56) References Cited

U.S. PATENT DOCUMENTS

| | | | |
|---|---|---|---|
| 2020/0052843 A1* | 2/2020 | Cheng | H04W 72/20 |
| 2020/0084747 A1* | 3/2020 | Hong | H04W 72/23 |
| 2020/0204658 A1* | 6/2020 | Yu | H04L 5/0053 |
| 2020/0412430 A1* | 12/2020 | Song | H04L 5/0051 |
| 2021/0083751 A1* | 3/2021 | Chen | H04W 72/21 |
| 2021/0105739 A1* | 4/2021 | Lin | H04L 5/0098 |
| 2021/0288773 A1* | 9/2021 | Lin | H04L 5/0048 |
| 2021/0307108 A1* | 9/2021 | Babaei | H04W 76/28 |
| 2022/0015057 A1* | 1/2022 | Bao | H04W 76/14 |
| 2022/0369283 A1* | 11/2022 | Ma | H04W 68/02 |

OTHER PUBLICATIONS

NTT Docomo, Inc., "Views on RS for phase tracking", R1-1612720, 3GPP TSG RAN WG1 Meeting #87, Nov. 2016, 5 pages.
European Patent Office Application Serial No. 21853478.2, Search Report dated Sep. 7, 2023, 7 pages.
MCC Support, "Draft Report of 3GPP TSG RAN WG1 #93 v0.1.0 (Busan, South Korea, May 21-25, 2018)", R1-180xxxx, 3GPP TSG RAN WG1 Meeting #94, Aug. 2018, XP051515433, 190 pages.

* cited by examiner

METHOD AND APPARATUS FOR TRANSMITTING AND RECEIVING WIRELESS SIGNAL IN WIRELESS COMMUNICATION SYSTEM

CROSS-REFERENCE TO RELATED APPLICATION(S)

This application is a continuation of International Application No. PCT/KR2021/010458, filed on Aug. 9, 2021, which claims the benefit of earlier filing date and right of priority to Korean Patent Application No. 10-2020-0099126, filed on Aug. 7, 2020, and 10-2021-0067827, filed on May 26, 2021, the contents of all of which are hereby incorporated by reference herein in their entireties.

TECHNICAL FIELD

The present disclosure relates to a wireless communication system, and more particularly, to a method and apparatus for transmitting and receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present disclosure, provided herein is a method for receiving a signal by a terminal in a wireless communication system. The method may include acquiring a configuration for a reference signal for a radio resource control (RRC) idle mode or an RRC inactive mode, determining availability of the reference signal, and receiving the reference signal in the RRC idle mode or the RRC inactive mode based on the determination of the availability of the reference signal and the acquired configuration for the reference signal. The terminal may determine the availability of the reference signal based on a specific signal received from a base station. The specific signal may be downlink control information (DCI) carried by a physical downlink control channel (PDCCH) detected in the RRC idle mode or the RRC inactive mode. Based on the DCI indicating that the reference signal is available, the terminal may assume that the reference signal will be received periodically in the RRC idle mode or the RRC inactive mode.

The PDCCH carrying the DCI may be detected based on a paging-radio network temporary identifier (P-RNTI).

The DCI may be paging-DCI, or specific DCI early indicating that the paging-DCI will be provided on a paging occasion (PO).

The specific DCI may include information about whether the paging-DCI includes information indicating the availability of the reference signal.

The specific DCI may indicate the availability of the reference signal for a specific time duration, wherein an end of the specific time duration may be related to a position of the PO.

The configuration for the reference signal may include information about a periodicity of the reference signal.

The configuration for the reference signal may be acquired through a system information block (SIB).

The configuration for the reference signal may be acquired in an RRC connected mode. The terminal may receive the reference signal in the RRC idle mode or the RRC inactive mode by maintaining the acquired configuration for the reference signal even when the terminal enters the RRC idle mode or the RRC inactive mode.

The DCI may indicate the availability of the reference signal by a short message field configured based on 3rd generation partnership project (3GPP).

The reference signal may include at least one of a channel state information-reference signal (CSI-RS) or a tracking reference signal (TRS).

In another aspect of the present disclosure, a computer-readable recording medium having recorded thereon a program for carrying out the signal reception method may be provided.

In another aspect of the present disclosure, a terminal for carrying out the signal reception method may be provided.

In another aspect of the present disclosure, a device for controlling a terminal for carrying out the signal reception method may be provided.

In another aspect of the present disclosure, provided herein is a method for transmitting a signal by a base station in a wireless communication system. The method may include transmitting a configuration for a reference signal for a terminal in a radio resource control (RRC) idle mode or an RRC inactive mode, transmitting information indicating availability of the reference signal, and transmitting the reference signal to a terminal in the RRC idle mode or the RRC inactive mode, based on the availability of the reference signal and the configuration for the reference signal. The base station may transmit the information indicating the availability of the reference signal through a specific signal. The specific signal may be downlink control information (DCI) carried by a physical downlink control channel (PDCCH) transmitted in the RRC idle mode or the RRC inactive mode. Based on the DCI indicating that the reference signal is available, the base station may periodically transmit the reference signal to the terminal in the RRC idle mode or the RRC inactive mode.

In another aspect of the present disclosure, a base station for carrying out the signal transmission method may be provided.

Advantageous Effects

According to an embodiment of the present disclosure, the RS may be provided in an RRC idle/inactive mode. In addition, availability of the RS may be indicated. Accordingly, more power-efficient RRC idle/inactive mode operation may be implemented from the UE perspective, and efficient radio resource management may be implemented from the network perspective.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

MODE FOR DISCLOSURE

Figure 1:
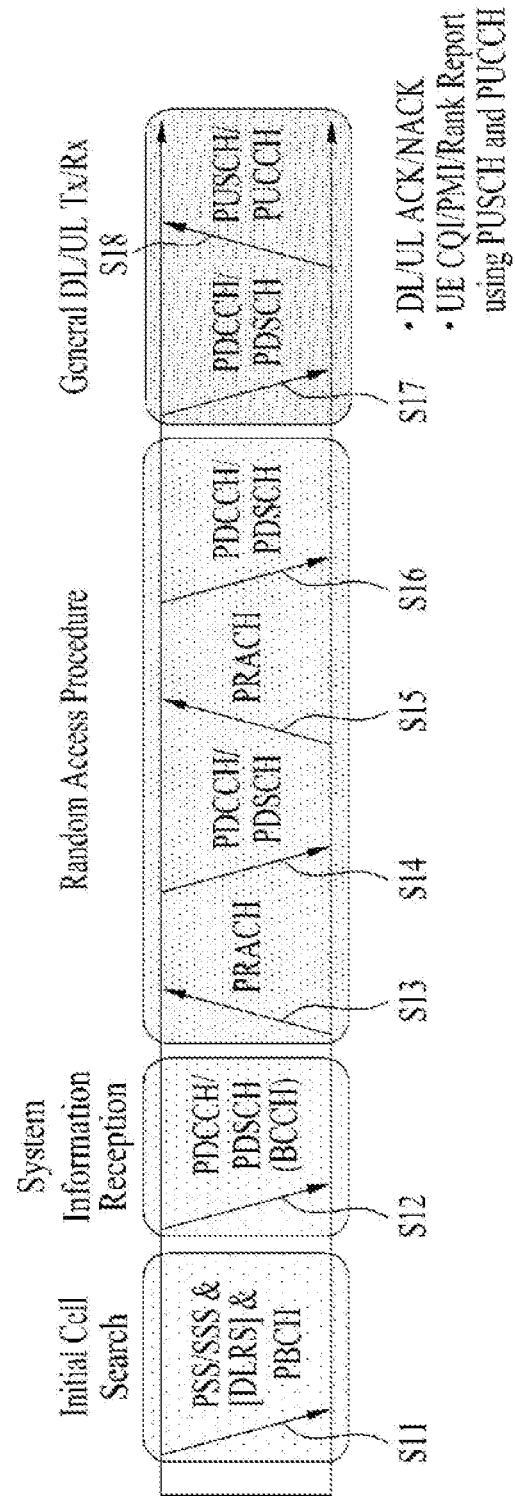
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In an embodiment of the present disclosure, for simplicity, this technology will be referred to as NR (New Radio or New RAT).

For the sake of clarity, 3GPP NR is mainly described, but the technical idea of the present disclosure is not limited thereto.

For the background art relevant to the present disclosure, the definitions of terms, and abbreviations, the following documents may be incorporated by reference.

3GPP LTE

TS 36.211: Physical channels and modulation

TS 36.212: Multiplexing and channel coding

TS 36.213: Physical layer procedures

TS 36.300: Overall description

TS 36.321: Medium Access Control (MAC)

TS 36.331: Radio Resource Control (RRC)

3GPP NR

TS 38.211: Physical channels and modulation

TS 38.212: Multiplexing and channel coding

TS 38.213: Physical layer procedures for control

TS 38.214: Physical layer procedures for data

TS 38.300: NR and NG-RAN Overall Description

TS 38.321: Medium Access Control (MAC)

TS 38.331: Radio Resource Control (RRC) protocol specification

Terms and Abbreviations

PSS: Primary Synchronization Signal

SSS: Secondary Synchronization Signal

CRS: Cell reference signal

CSI-RS: Channel State Information Reference Signal

TRS: Tracking Reference Signal

SS: Search Space

CSS: Common Search Space

USS: UE-specific Search Space

PDCCH: Physical Downlink Control Channel; The PDCCH is used to represent PDCCHs of various structures which may be used for the same purpose in the following description.

DCI: Downlink Control Information

WUS: Wake Up Signal; The WUS may be used to represent other method signals or channels (e.g., a paging early indication (PEI)), which perform a similar function.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUS CH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
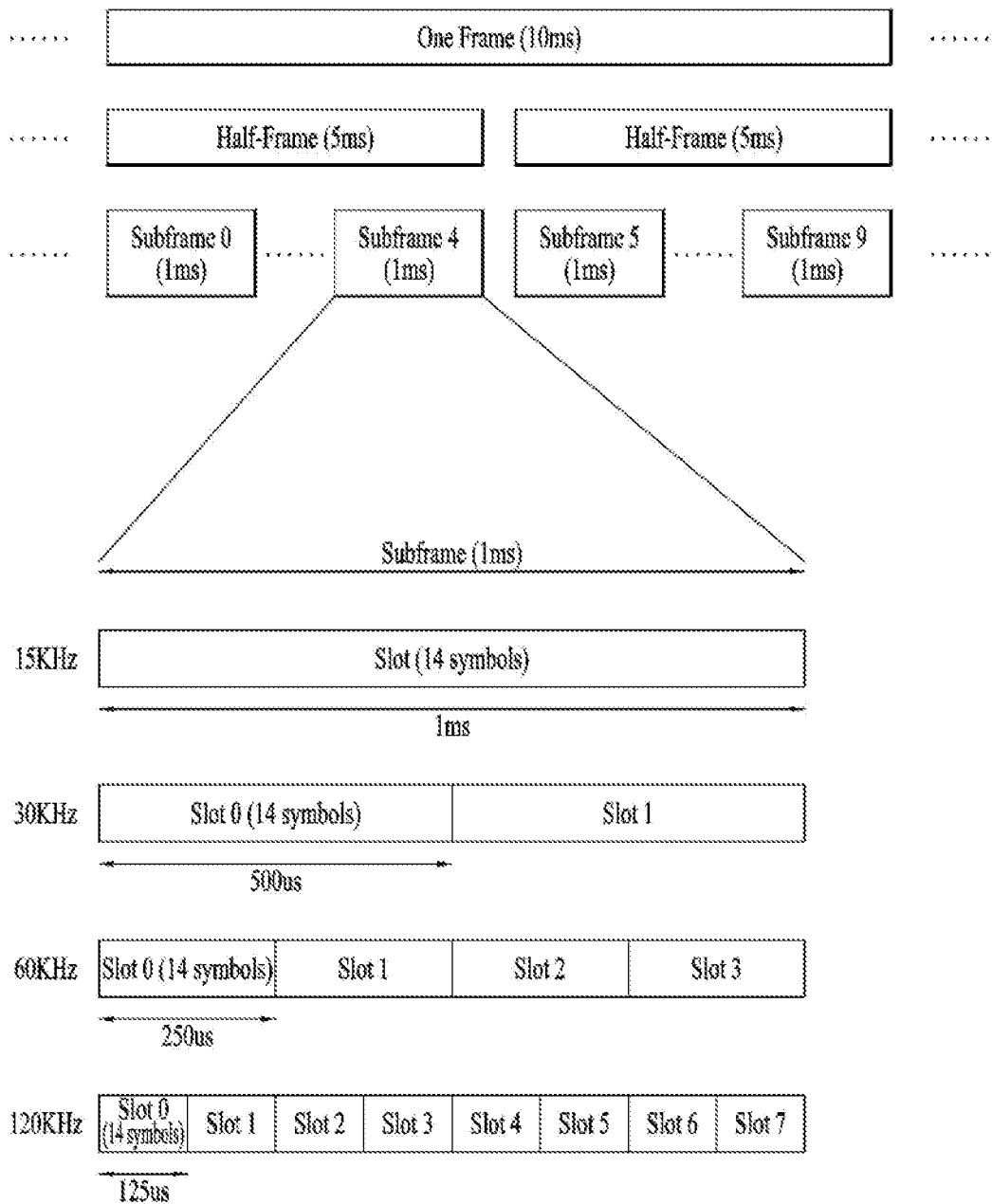
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
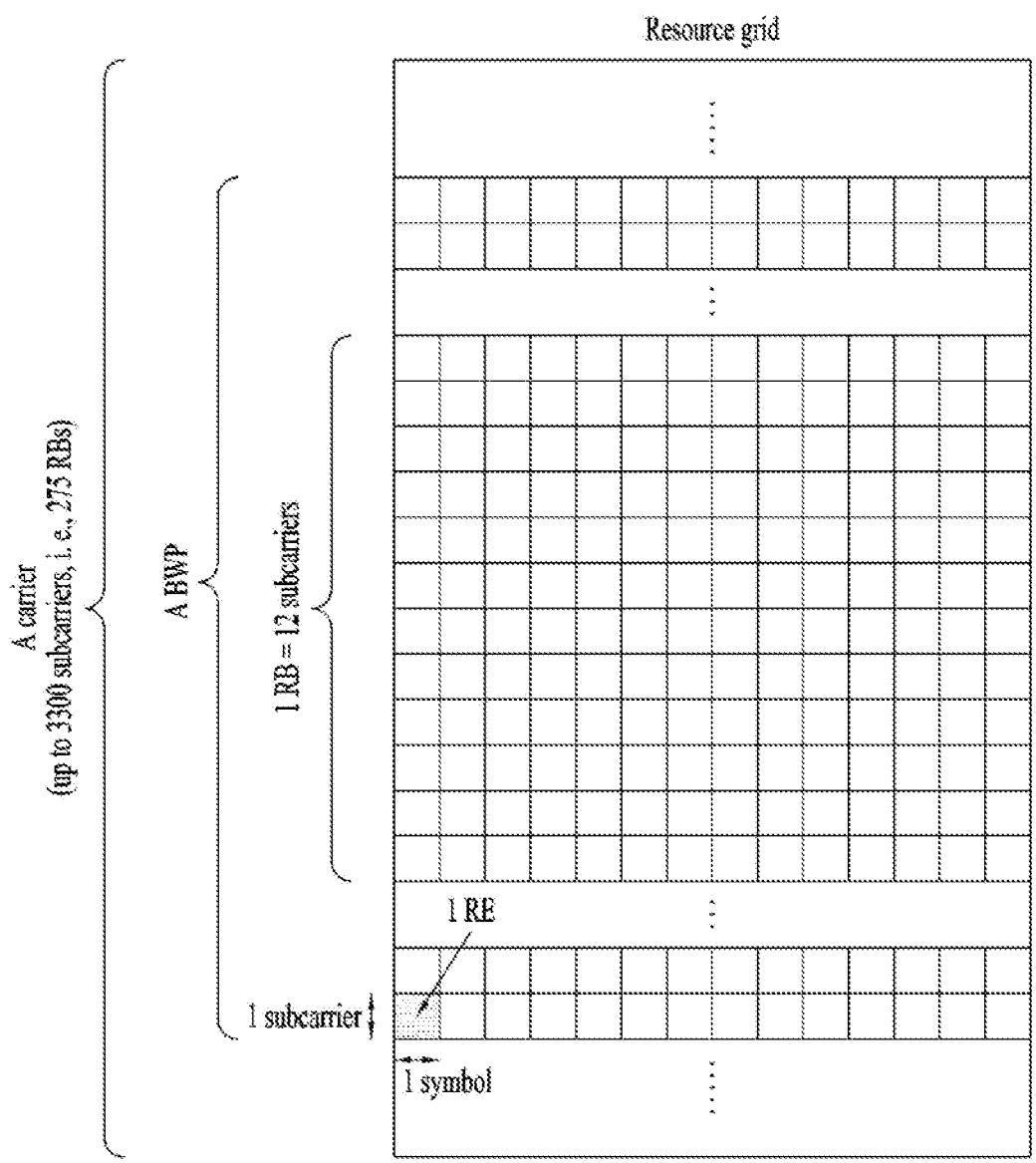
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
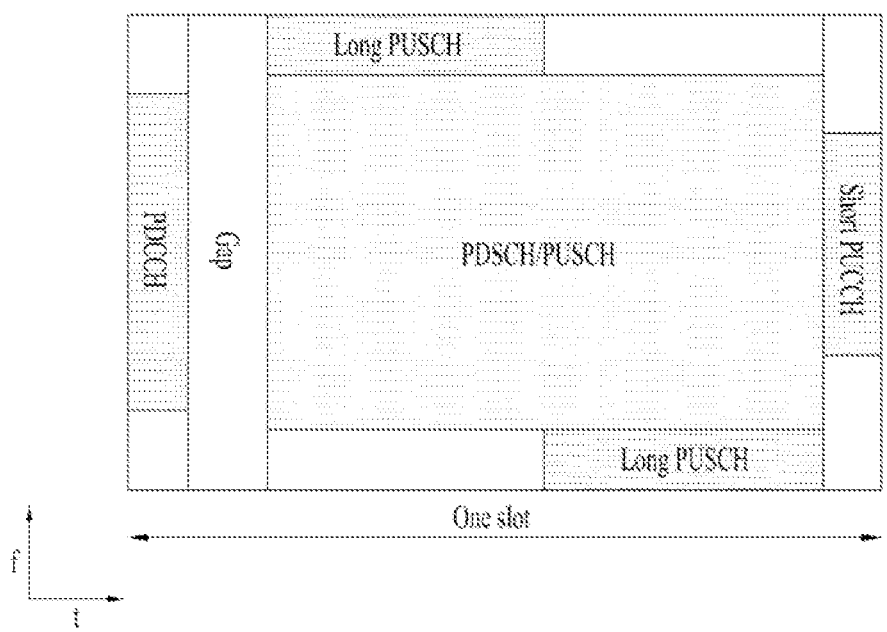
FIG. 4 illustrates exemplary mapping of physical channels in a slot.

FIG. 4 illustrates an example of mapping physical channels in a slot. In an NR system, a frame is characterized by a self-contained structure in which all of a DL control channel, DL or UL data, and a UL channel may be included in one slot. For example, the first N symbols of a slot may be used to carry a DL channel (e.g., PDCCH) (hereinafter, referred to as a DL control region), and the last M symbols of the slot may be used to carry a UL channel (e.g., PUCCH) (hereinafter, referred to as a UL control region). Each of N and M is an integer equal to or larger than 0. A resource area (hereinafter, referred to as a data region) between the DL control region and the UL control region may be used to transmit DL data (e.g., PDSCH) or UL data (e.g., PUSCH). A guard period (GP) provides a time gap for switching from a transmission mode to a reception mode or from the reception mode to the transmission mode. Some symbols at a DL-to-UL switching time in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
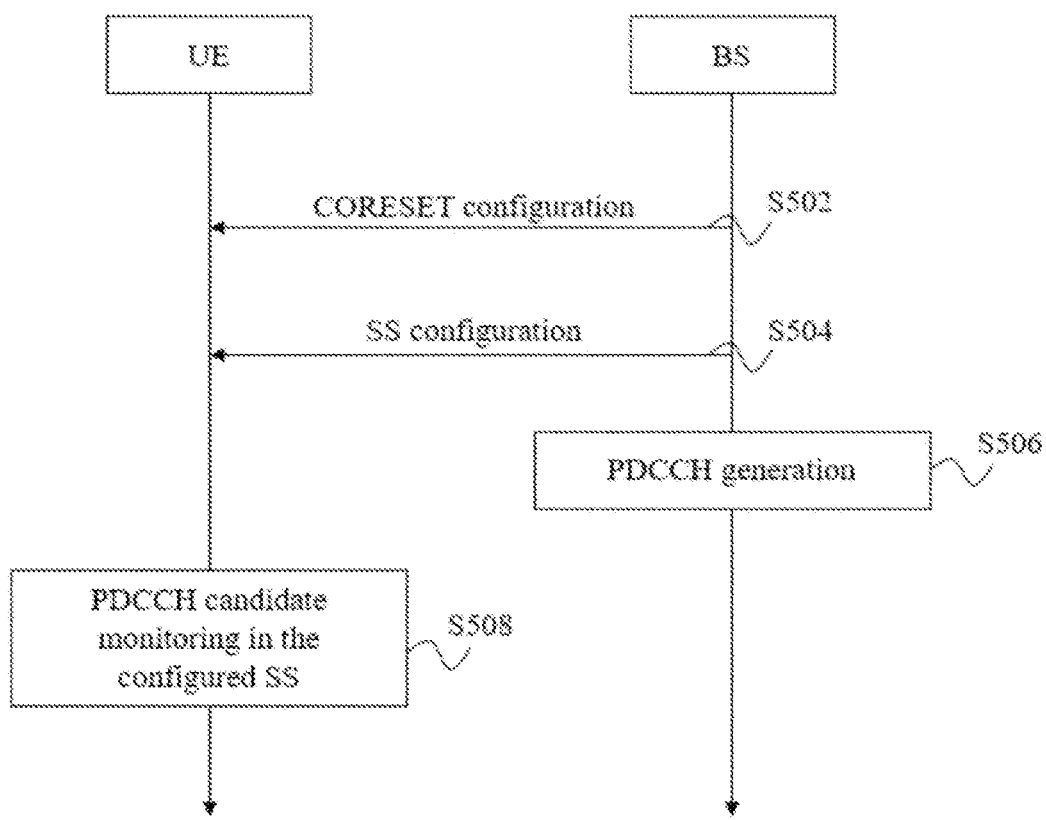
FIG. 5 illustrates an exemplary physical downlink control channel (PDCCH) transmission and reception process.
Figure 6:
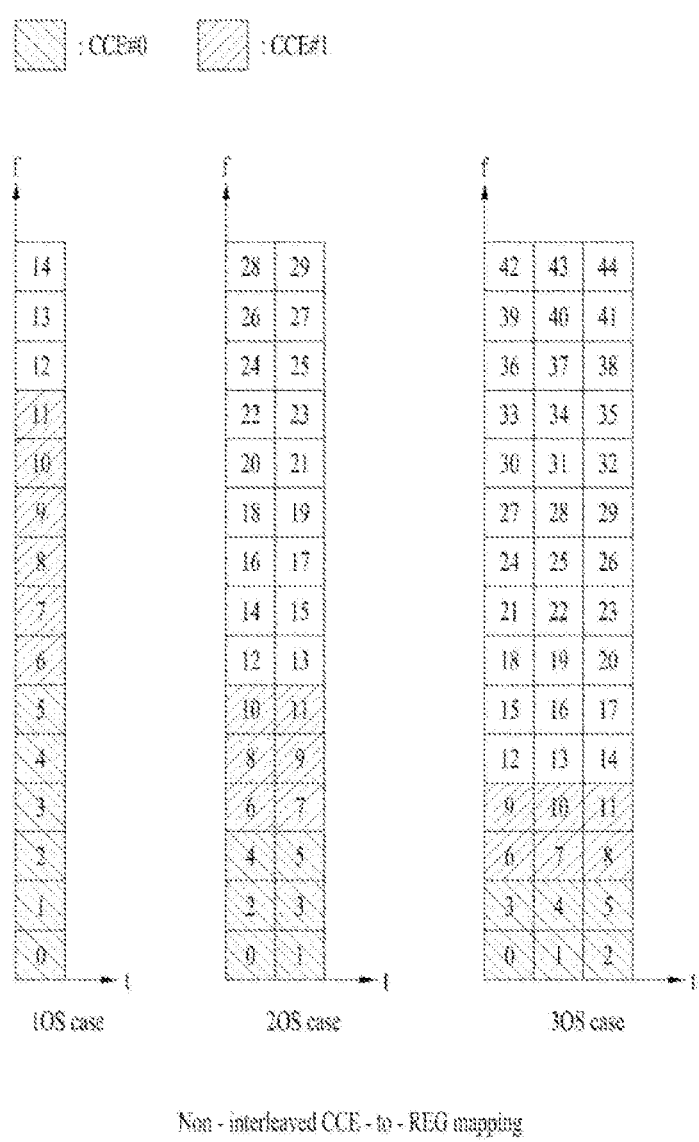
FIGS. 6 to 7 illustrate a structure of a control resource set (CORESET).
Figure 7:
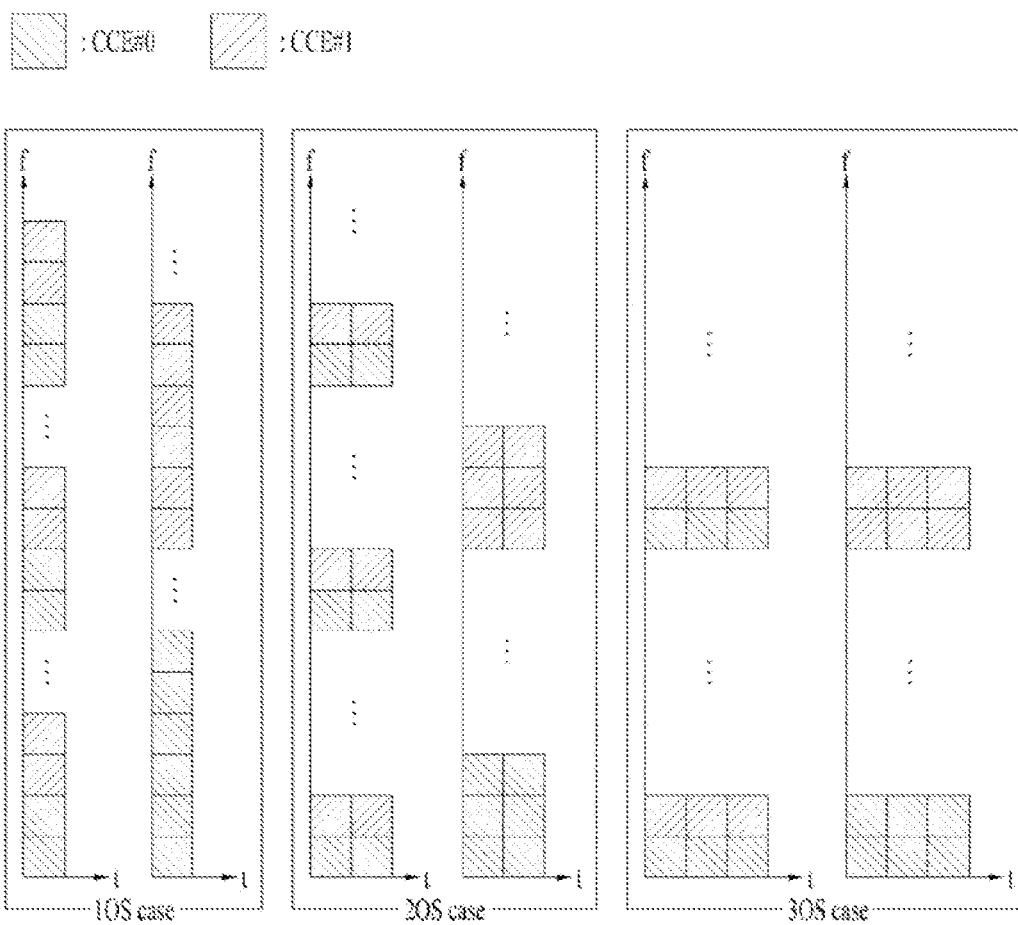

FIG. 5 illustrates an exemplary PDCCH transmission/reception process.

Referring to FIG. 5, a BS may transmit a control resource set (CORESET) configuration to a UE (S502). A CORESET is defined as a resource element group (REG) set having a given numerology (e.g., a subcarrier spacing (SCS), a cyclic prefix (CP) length, and so on). An REG is defined as one OFDM symbol by one (physical) resource block (P)RB. A plurality of CORESETs for one UE may overlap with each other in the time/frequency domain. A CORESET may be configured by system information (e.g., a master information block (MIB)) or higher-layer signaling (e.g., radio resource control (RRC) signaling). For example, configuration information about a specific common CORESET (e.g., CORESET #0) may be transmitted in the MIB. For example, a PDSCH carrying system information block 1 (SIB1) may be scheduled by a specific PDCCH, and CORESET #0 may be used to transmit the specific PDCCH. Further, configuration information about CORESET #N (e.g., N>0) may be transmitted by RRC signaling (e.g., cell-common RRC signaling, UE-specific RRC signaling, or the like). For example, the UE-specific RRC signaling carrying CORESET configuration information may include, but not limited to, various types of signaling such as an RRC setup message, an RRC reconfiguration message, and/or BWP configuration information. Specifically, a CORESET configuration may include the following information/fields.

controlResourceSetId: Indicates the ID of a CORESET.
    frequencyDomainResources: Indicates the frequency-domain resources of the CORESET. The resources are indicated by a bitmap in which each bit corresponds to an RB group (=6 (consecutive) RBs). For example, the most significant bit (MSB) of the bitmap corresponds to a first RB group in a BWP. An RB group corresponding to a bit having a bit value of 1 is allocated as frequency-domain resources of the CORESET.
    duration: Indicates the time-domain resources of the CORESET. It indicates the number of consecutive OFDM symbols included in the CORESET. The duration has a value between 1 and 3.
    cce-REG-MappingType: Indicates a control channel element (CCE)-to-REG mapping type. An interleaved type and a non-interleaved type are supported.
    interleaverSize: Indicates an interleaver size.
    pdcch-DMRS-ScramblingID: Indicates a value used for PDCCH DMRS initialization. When pdcch-DMRS-ScramblingID is not included, the physical cell ID of a serving cell is used.
    precoderGranularity: Indicates a precoder granularity in the frequency domain.
    reg-BundleSize: Indicates an REG bundle size.
    tci-PresentInDCI: Indicates whether a transmission configuration index (TCI) field is included in DL-related DCI.
    tci-StatesPDCCH-ToAddList: Indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown as separately signaled in FIG. 5, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a UE-specific search space (USS) set or a common search space (CSS) set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: Indicates the ID of an SS.
    controlResourceSetId: Indicates a CORESET associated with the SS.
    monitoringSlotPeriodicityAndOffset: Indicates a periodicity (in slots) and offset (in slots) for PDCCH monitoring.
    monitoringSymbolsWithinSlot: Indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.
    nrofCandidates: Indicates the number of PDCCH candidates (one of values 0, 1, 2, 3, 4, 5, 6, and 8) for each AL where AL={1, 2, 4, 8, 16}.
    searchSpaceType: Indicates CSS or USS as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is configured as one of an interleaved CCE-to-REG type and a non-interleaved CCE-to-REG type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is set on a CORESET basis.

Paging

The network may (i) access to UEs in RRC_IDLE, RRC_INACTIVE, and RRC_CONNECTED states by paging messages, and (ii) indicate a system information change and an earthquake and tsunami warning system/commercial mobile alert system (ETWS/CMAS) notification to UEs in the RRC_IDLE and RRC_INACTIVE states and UEs in the RRC_CONNECTED state by short messages. Both a paging message and a short message are transmitted based on a P-RNTI-based PDCCH. The paging message is transmitted on a logical channel, paging control channel (PCCH), whereas the short message is directly transmitted on a physical channel, PDCCH. Because the logical channel, PCCH is mapped to a physical channel, PDSCH, the paging message may be understood as scheduled based on a P-RNTI-based PDCCH.

While the UE stays in the RRC_IDLE state, the UE monitors a paging channel for core network (CN)-initiated paging. In the RRC_INACTIVE state, the UE also monitors the paging channel, for radio access network (RAN)-initiated paging. The UE does not need to monitor the paging channel continuously. Paging discontinuous reception (DRX) is defined as monitoring a paging channel only during one paging occasion (PO) per DRX cycle by a UE in the RRC_IDLE or RRC_INACTIVE state. A paging DRX cycle is configured by the network, as follows.

1) In the case of CN-initiated paging, a default cycle is broadcast in system information.

2) In the case of CN-initiated paging, a UE-specific cycle is configured by NAS signaling.

3) In the case of RAN-initiated signaling, a UE-specific cycle is configured by RRC signaling.

Because all of POs of the UE for CN-initiated signaling and RAN-initiated signaling are based on the same UE ID, the two POs overlap with each other. The number of POs in a DRX cycle may be set by system information, and the network may distribute UEs to the POs based on IDs.

When the UE is in the RRC_CONNECTED state, the UE monitors a paging channel in each PO signaled by system information, for an SI change indication and a PWS notification. In bandwidth adaptation (BA), the RRC_CONNECTED UE monitors only a paging channel in an active BWP in which a configured CSS is located.

In shared spectrum channel access, additional PDCCH monitoring occasions may be configured in a PO of the UE, for paging monitoring. However, when the UE detects a P-RNTI-based PDCCH transmission in its PO, the UE does not need to monitor subsequent PDCCH monitoring occasions in the PO.

To reduce power consumption, the UE may use DRX in the RRC_IDLE and RRC_INACTIVE states. The UE monitors one PO per DRX cycle. A PO is a set of PDCCH monitoring occasions, and may include multiple time slots (e.g., subframes or OFDM symbols) in which paging DCI may be transmitted. One paging frame (PF) is one radio frame and may include one or more POs or the starting points of one or more POs.

In a multi-beam operation, the UE assumes that the same paging message and the same short message are repeated in all transmission beams. The paging message is the same for both of RAN-initiated paging and CN-initiated paging.

Upon receipt of RAN-initiated paging, the UE initiates an RRC connection resume procedure. Upon receipt of CN-initiated paging in the RRC_INACTIVE state, the UE transitions to the RRC_IDL state and notifies the NAS of the CN-initiated paging.

A PF and a PO for paging are determined in the following manner:

An SFN for the PF is determined by:

$$(SFN+PF\_offset) \bmod T = (T \text{ div } N)*(UE\_ID \bmod N)$$

An index i_s indicating the index of the PO is determined by:

$$i\_s = \text{floor}(UE\_ID/N) \bmod Ns$$

The following parameters may be used to calculate the PF and i_s above.

T: The DRX cycle of the UE (T is determined by the smallest of UE-specific DRX values (if configured by RRC and/or an upper layer) and a default DRX value broadcast in system information. In the RRC_IDLE state, if UE-specific DRX is not configured by an upper layer, the default value is applied).

N: Number of total paging frames in T

Ns: Number of POs for a PF

PF_offset: Offset used for PF determination

UE_ID: 5G-S-TMSI mod 1024

WUS (Wake-up signal)/PEI (Paging Early Indication)

Figure 8:
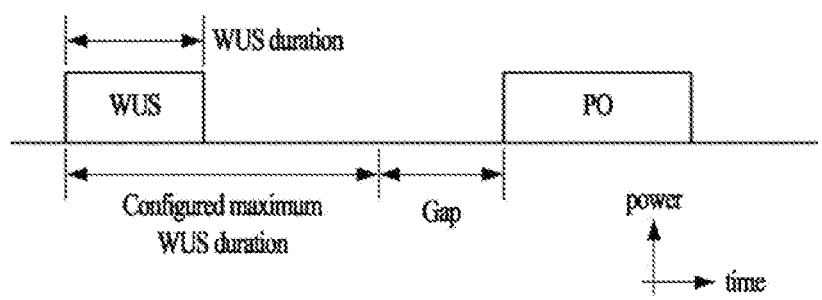
FIG. 8 illustrates a wake-up signal in LTE.

In LTE Rel-15 NB-IoT and MTC, a wake-up signal (WUS) was introduced to save power of a UE. The WUS is a signal indicating preliminarily whether there is an actual paging transmission in a paging SS at a specific position. When the BS wants to transmit paging in a PO at a specific position, the BS may transmit a WUS at WUS transmission position(s) associated with the PO. The UE monitors the WUS transmission positions associated with the PO at the specific position. Upon detection of the WUS at the WUS transmission position(s), the UE may expect that paging will be transmitted in the PO, whereas when failing to detect the WUS at the WUS transmission position(s), the UE may not expect paging in the PO. The gain of power saving may be achieved by this operation. In LTE Rel-16 NB-IoT and MTC, a UE-group WUS was introduced to increase the power saving gain of the Rel-15 WUS. The UE-group WUS may advantageously reduce an unnecessary wakeup probability of a UE by using a WUS transmission position and sequence determined based on the UE-group ID of the UE. FIG. 8 is a diagram illustrating a WUS in an LTE system. Referring to FIG. 8, in MTC and NB-IoT, the WUS may be used to reduce power consumption related to paging monitoring. The WUS is a physical layer signal indicating whether a UE is supposed to monitor a paging signal (e.g., an MPDCCH/NPDCCH scrambled with a P-RNTI) according to a cell configuration. For a UE which is not configured with eDRX (i.e., configured only with DRX), the WUS may be associated with one PO (N=1). On the contrary, for a UE configured with eDRX, the WUS may be associated with one or more POs (N>1). Upon detection of the WUS, the UE may monitor N POs after being associated with the WUS. When failing to detect the WUS, the UE may maintain sleep mode by skipping PO monitoring until the next WUS monitoring. The UE may receive WUS configuration information from the BS and monitor the WUS based on the WUS configuration information. The WUS configuration information may include, for example, a maximum WUS duration, the number of consecutive POs associated with the WUS, and gap information. The maximum WUS duration may refer to a maximum time period during which the WUS may be transmitted, and may be expressed as a ratio to a maximum repetition number (e.g., Rmax) related to a PDCCH (e.g., MPDCCH or NPDCCH). Although the UE may expect repeated WUS transmissions within the maximum WUS duration, the number of actual WUS transmissions may be less than a maximum number of WUS transmissions within the maximum WUS duration. For example, the number of WUS repetitions may be small for a UE in good coverage. A resource/occasion in which the WUS may be transmitted within the maximum WUS duration is referred to as a WUS resource. The WUS resource may be defined as a plurality of consecutive OFDM symbols by a plurality of consecutive subcarriers. The WUS resource may be defined as a plurality of consecutive OFDM symbols by a plurality of consecutive subcarriers in a subframe or slot. For example, the WUS resource may be defined as 14 consecutive OFDM symbols by 12 consecutive subcarriers. Upon detection of the WUS, the UE does not monitor the WUS until a first PO associated with the WUS. When the WUS is not detected during the maximum WUS duration, the UE does not monitor a paging signal in POs associated with the WUS (or the UE remains in the sleep mode).

Figure 9:
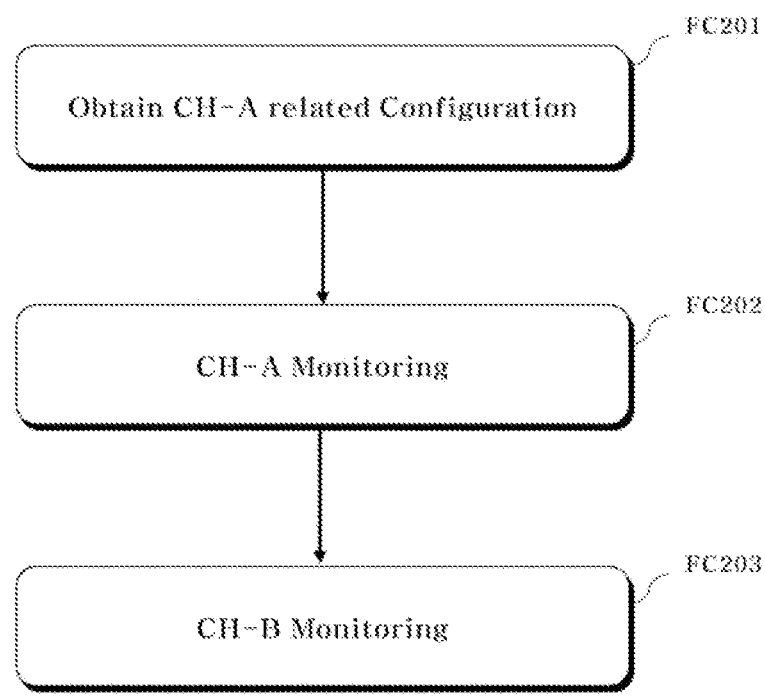
FIG. 9 illustrates a UE operation according to an example of the present disclosure.

Even in communication systems such as NR, a method of transmitting information about channel-B (e.g., paging) through channel/signal-A (e.g., PEI composed of a control channel such as DCI, for short, P-DCI) may be newly defined. FIG. 9 illustrates a PEI-based UE operation. The UE may receive configuration information related to channel/signal-A (e.g., P-DCI) to perform an operation for channel/signal-A (e.g., P-DCI) (FC201). For example, the UE may receive the configuration information using a higher layer signal (e.g., SIB or RRC signaling). The UE may expect and monitor channel/signal-A (e.g., P-DCI) based on the configuration information (FC202). For example, the BS may expect information including UE-group ID information, cell ID information, short message related information, and/or PDSCH scheduling information through channel/signal-A (e.g., P-DCI). The UE may also monitor channel/signal-A (e.g., P-DCI) generated at a position (e.g., search space) where the channel/signal-A (e.g., P-DCI) may be transmitted, based on the above configuration information. If the UE succeeds in detecting channel/signal-A (e.g., P-DCI) in the monitoring operation and is instructed to monitor channel/signal-B (FC202), the UE may monitor channel/signal-A (e.g., P-DCI) at a position related to the transmitted channel/signal-A (FC203). For example, signal-B may be a reference signal (e.g., DMRS, CSI-RS/TRS), and channel-B may be a PDCCH for scheduling a paging message or a PDSCH containing a paging message.

Reference Signal for IDLE/INACTIVE-Mode

Hereinafter, a method of defining and utilizing a reference signal that may be used for tracking/measurement in order to obtain a power saving effect of an idle/inactive mode UE is proposed.

In LTE, a synchronization signal (i.e. PSS/SSS) is transmitted at intervals of 10 ms, and the CRS is transmitted in almost all subframes and PRBs. Accordingly, when the UE intends to perform time/frequency synchronization or tracking or measurement, it is allowed to easily utilize such always-on reference signals.

In NR, based on Rel-16, the UE may utilize the SSB for measurement and time/frequency tracking in idle/inactive mode. However, the basic transmission interval of the SSB including the SSS available for the measurement is 20 ms, and there is no available always-on reference signal like the CRS of LTE in NR.

Accordingly, in the NR system, a UE operating in the idle/inactive mode may need to wake up frequently for reference signal reception/measurement or the like. Further, in the idle/inactive mode, time/frequency tracking performance may be relatively deteriorated. As a more specific example, when a UE in the the idle/inactive mode prepares to receive paging as follows. Synchronization/channel estimation is required for the UE to receive paging DCI and a paging message. In the idle/inactive mode, the UE receives and measure multiple SSBs as necessary. The basic SSB transmission interval is a relatively long period of 20 ms. Accordingly, in a situation where measurement of several SSBs is required, the UE maintains the wake-up state for a long time and a lot of power is consumed for SSB detection and measurement.

For the PDCCH, channel coding/modulation of is robustly performed. Accordingly, channel estimation/synchronization at a level at which the UE may decode the PDCCH does not consume high power and overhead therefor is not high. However, PDSCH reception requires a higher level of channel estimation and synchronization than the PDCCH. Accordingly, monitoring only the PDCCH such as the paging DCI does not consume high power, but it may take a lot of power and time to prepare for channel estimation (e.g., SSB-based estimation) as to receive a PDSCH scheduled by the paging DCI (in case the PDSCH is scheduled for the UE).

As a method to address this issue, it is proposed that the idle/inactive UE measure/use a reference signal (in addition to or in place of the SSB measurement) while maintaining the idle/inactive mode.

According to the current Rel-16 NR, the CSI-RS may be used for CSI estimation, beam management, time-frequency tracking (e.g., TRS), and the like. The TRS may be configured to support estimation of delay spread and Doppler spread while improving performance of time/frequency tracking. Configuration of the CSI-RS/TRS is information configured by RRC signaling in the connected mode, and transmission of CSI-RS/TRS cannot be expected in the idle/inactive mode of the current NR system.

A method for utilizing a specific reference signal, for example, CSI-RS/TRS, in the idle/inactive mode to improve the performance of the UE for measurement and time/frequency tracking in the idle/inactive mode is proposed. Also, a method for notifying the UE of configuration information about the CSI-RS/TRS for the idle/inactive mode by the BS and a method for enabling/activating/triggering or disabling/deactivating transmission of the CSI-RS/TRS are proposed.

As an example, a reference signal in a communication system such as LTE and NR may be utilized by a UE in an idle/inactive mode. In this case, the specific reference signal may have a structure such as a channel state information-reference signal (CSI-RS) or a tracking reference signal (TRS) defined in NR. In the present disclosure, such specific reference signals are collectively referred to as CSI-RS/TRS without being separately distinguished from each other. Depending on the context, the CSI-RS/TRS may mean only one of the CSI-RS and the TRS, or mean that it is commonly applied to both. The methods proposed in the present disclosure may be applied not only to the CSI-RS and TRS but also to reference signals available for measurement, channel estimation, and time/frequency tracking in the idle/inactive mode.

For example, CSI-RSs in the idle/inactive mode may also be defined as Zero-power (ZP) and non-zero-power (NZP) CSI-RSs. Table 5 shows a sequence r(m) for the reference signal defined in NR TS38.211. For example, the sequence r(m) in Table 5 may be used for the CSI-RS in the idle/inactive mode.

TABLE 5

$$r(m) = \frac{1}{\sqrt{2}}(1 - 2 \cdot c(2m)) + j\frac{1}{\sqrt{2}}(1 - 2 \cdot c(2m + 1))$$

where the pseudo-random sequence c(i) is defined. The pseudo-random sequence generator shall be initialised with
$c_{init} = (2^{10} (N_{symb}^{slot} n_{s,f}^\mu + 1 + 1)(2n_{ID} + 1) + n_{ID}) \mod 2^{31}$
at the start of each OFDM symbol where $n_{s,f}^\mu$, is the slot number within a radio frame, l is the OFDM symbol number within a slot, and $n_{ID}$ is provided by a higher-layer parameter. For each CSI-RS configured, the UE shall assume the sequence r(m) being mapped to resources elements (k, l)$_{p,\mu}$. The resource element (k, l)$_{p,\mu}$ is within the resource blocks occupied by the CSI-RS resource for which the UE is configured. The time-domain locations of the CSI-RS may be provided by the higher-layer parameters(such as 'firstOFDMSymbolInTimeDomain' in below IE) and the frequency domain location of the CSI-RS may be given by a bitmap provided by the higher-layer parameter(such as 'frequencyDomainAllocation' in below IE).

Table 6 shows a 'CSI-RS-ResourceMapping' information element (IE) related to the RRC connected mode CSI-RS defined in NR TS38.331. The CSI-RS-ResourceMapping IE in Table 6 may be used to configure RE mapping of the CSI-RS in the time/frequency domain.

TABLE 6

CSI-RS-ResourceMfapping information element

```
-- ASN1START
-- TAG-CSI-RS-RESOURCEMAPPTNG-START
CSI-RS-ResourceMapping ::=          SEQUENCE {
    frequencyDomainAllocation       CHOICE {
        row1                            BIT STRING (SIZE (4)),
        row2                            BIT STRING (SIZE (12)),
        row4                            BIT STRING (SIZE (3)),
        other                           BIT STRING (SIZE (6))
    },
    nrofPorts                       ENUMERATED {p1,p2,p4,p8,p12,p16,p24,p32}.
    firstOFDMSymbolInTimeDomain     INTEGER (0 . . . 13),
    firstOFDMSymbolInTimeDomain2    INTEGER (2 . . . 12)
    OPTIONAL,    -- Need R
```

TABLE 6-continued

| | |
|---|---|
| cdm-Type | ENUMERATED {noCDM, fd-CDM2, cdm4-FD2-TD2, cdm8-FD2-TD4}, |
| density | CHOICE { |
| dot5 | ENOMERATED {evenPRBs, oddPRBs}, |
| one | NULL, |
| three | NULL, |
| spare | NULL |
| }, | |
| freqBand | CSI-FrequencyOccupation, |
| . . . | |
| } | |
| -- TAG-CSI-RS-RESOURCEMAPING-STOP | |
| -- ASNISTOP | |

<CSI-RS-ResourceMapping field deseriptions>

- 'cdm-Type': CDM type.
- 'density': Density of CSI-RS resource measured in RE/port/PRB.
- 'freqBand': Wideband or partial band CS-RS
- 'firstOFDMSymbolInTimeDomain': Time domain allocation within a physical resource block. The field indicates the first OFDM. symbol in the PRB used for CSI-RS.
- 'frequencyDomainAllocation': Frequency domain allocation within a physical resource block. The applicable row number is determined by the frequeneyDomainAllocation for rows 1, 2 and 4, and for other rows by matching the values in the column Ports, Density and CDMtype with the values of nrofPorts. cdm-Type and density below.
- 'nrofPorts': Number of ports.
The UE is not expected to receive CSI-RS and DM-RS on the same resource elements.
For channel State estimation purposes, the LE may be configured to measure CSI-RS and estimate the downlink channel state based on the CSI-RS measurements. The UE feeds the estimated channel state back to the gNB to be used in link adaptation.

Figure 10:
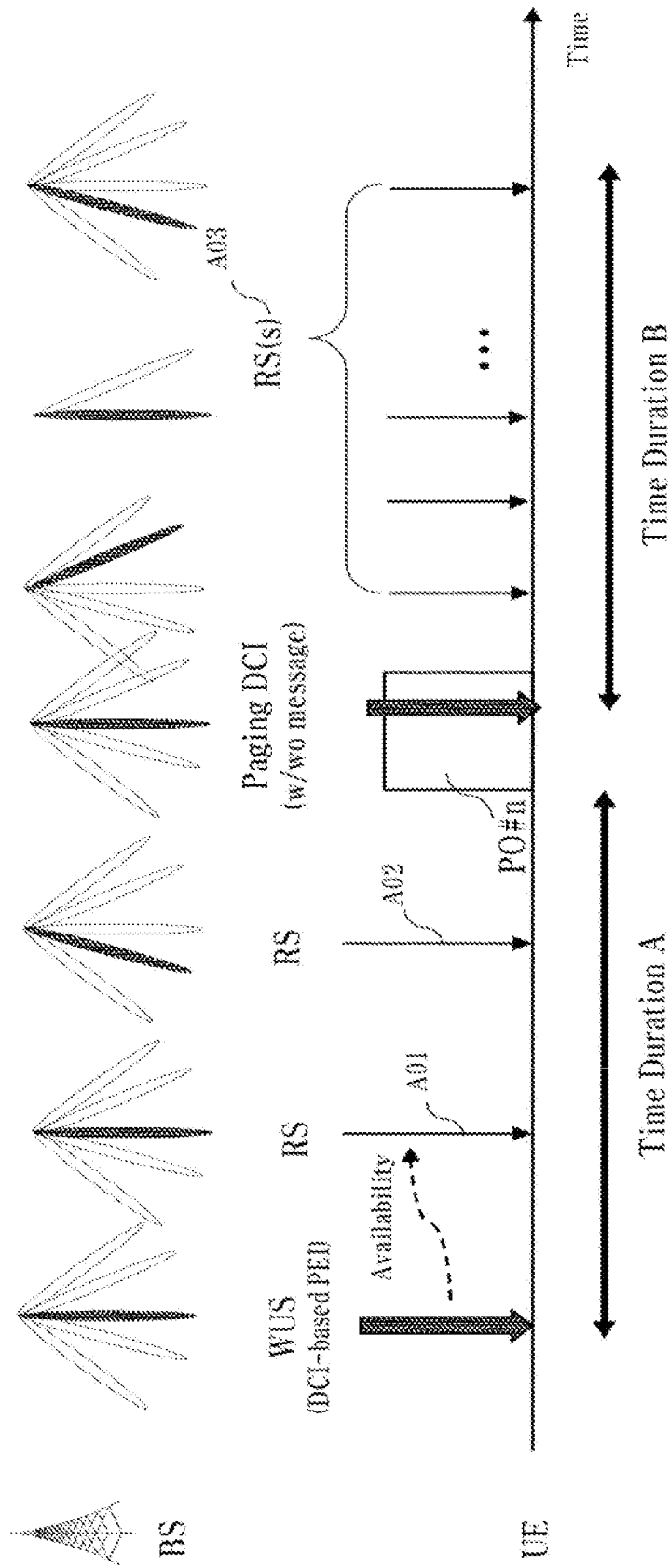
FIG. 10 illustrates signal transmission and reception according to an example of the present disclosure.

FIG. 10 is a flowchart illustrating an operation of a BS to which the method proposed in the present disclosure may be applied.

Referring to FIG. 10, the BS may generate CSI-RS/TRS related configuration information to support the operation of CSI-RS/TRS and transmit the same (A01). For example, the configuration information may be transmitted by a higher layer signal (e.g., SIB or RRC signaling).

The BS may transmit information indicating that the CSI-RS/TRS is transmitted (e.g., Availability Indication for CSI-RS/TRS in Idle/Inactive mode) (A02). For example, information indicating that CSI-RS/TRS transmission based on the CSI-RS/TRS related configuration information is started may be transmitted. The information indicating the start of the CSI-RS/TRS transmission may be transmitted by one of MAC CE, RRC, and DCI, or a combination of at least a part thereof. For example, the information indicating that the CSI-RS/TRS is transmitted may include detailed information about actual transmission of the CSI-RS/TRS (e.g., at least a part of 'CSI-RS-ResourceMapping' in Table 6).

After transmitting the information indicating that the CSI-RS/TRS is transmitted, the BS may generate/transmit the CSI-RS/TRS based on the CSI-RS/TRS related configuration information (A03). When the information indicating that the CSI-RS/TRS is transmitted (A02) further includes the detailed information about the actual transmission of the CSI-RS/TRS, the BS may generate and transmit the CSI-RS/TRS, further considering the detailed information.

The BS may transmit information indicating that the transmission of the CSI-RS/TRS is terminated in order to finish the transmission of the CSI-RS/TRS (A04). When there is a predetermined termination time of the transmission of the CSI-RS/TRS, the operation may be skipped.

Figure 11:
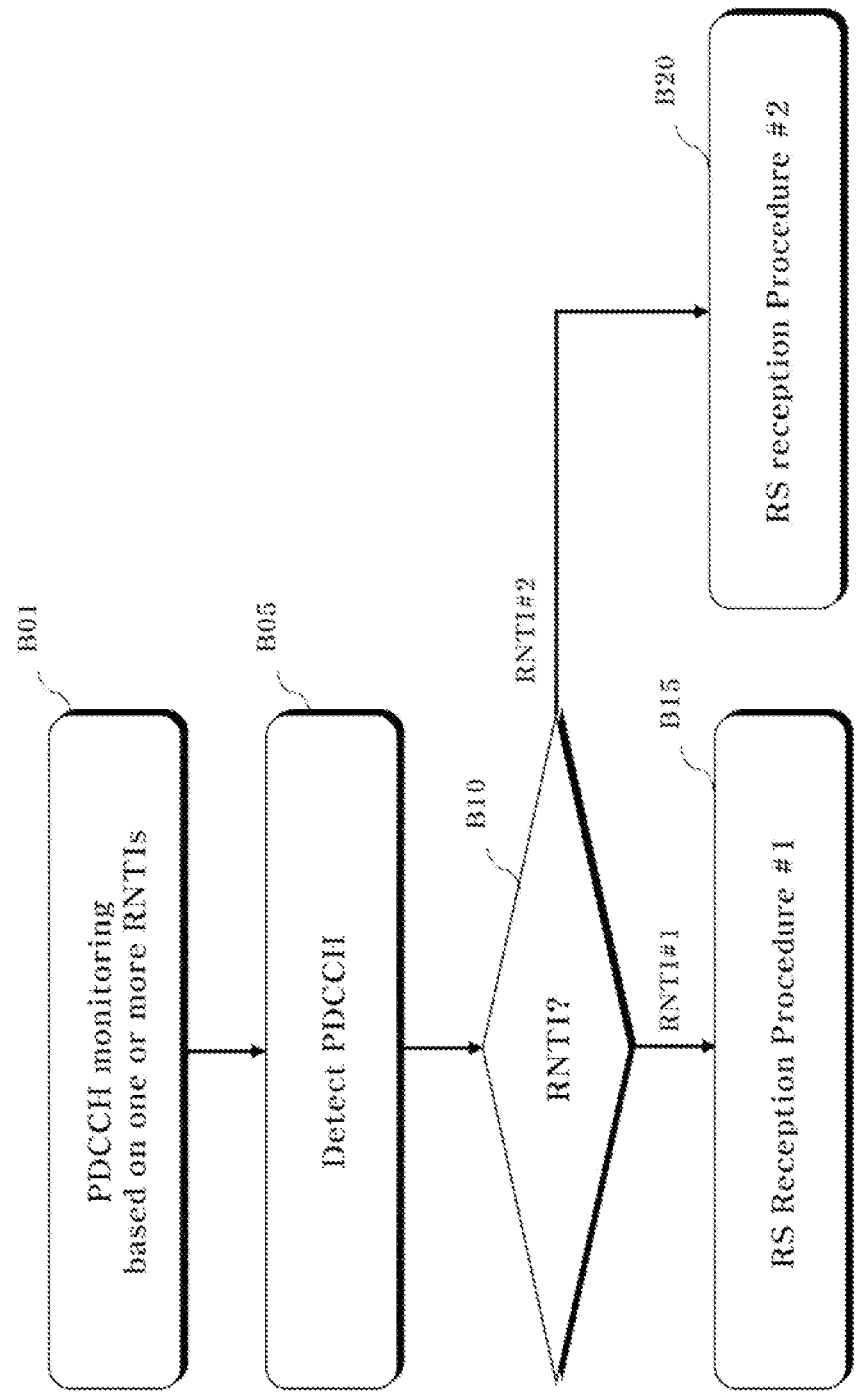
FIG. 11 illustrates reception of a reference signal by a UE according to an example of the present disclosure.

FIG. 11 illustrates an example of a UE operation to which a proposal may be applied.

Referring to FIG. 11, the UE may receive CSI-RS/TRS related configuration information (B01). As an example, the UE may receive the CSI-RS/TRS related configuration information by a higher layer signal (e.g., SIB or RRC signaling).

The UE may detect/receive information indicating that the CSI-RS/TRS is transmitted by monitoring a specific channel (B02). As described above, the information indicating that the CSI-RS/TRS is transmitted may indicate that CSI-RS/TRS transmission based on the CSI-RS/TRS related configuration information is started. The information indicating the start of the CSI-RS/TRS transmission may be transmitted by one of MAC CE, RRC, and DCI, or a combination of at least a part thereof. For example, the information indicating that the CSI-RS/TRS is transmitted may include detailed information about actual transmission of the CSI-RS/TRS (e.g., at least a part of 'CSI-RS-ResourceMapping' in Table 6).

After transmitting the information indicating that the CSI-RS/TRS is transmitted, the BS may perform CSI-RS/TRS reception based on CSI-RS/TRS related configuration information (B03). When the information indicating that the CSI-RS/TRS is transmitted (B02) further includes the detailed information about the actual transmission of the CSI-RS/TRS, the UE may receive the CSI-RS/TRS, further considering the detailed information.

When the UE fails to acquire the information indicating that the CSI-RS/TRS is transmitted, it may perform monitoring again to acquire the information indicating that the CSI-RS/TRS is transmitted (B02).

The UE may expect and monitor information indicating that the transmission of the CSI-RS/TRS is terminated (B04). When the UE receives the information indicating that the transmission of the CSI-RS/TRS is terminated, it may no longer expect to receive the CSI-RS/TRS. In this case, it may perform the monitoring again to acquire the information indicating that the CSI-RS/TRS is transmitted. When the UE fails to receive the information indicating that the transmission of the CSI-RS/TRS is terminated, the UE may continue to expect to receive the CSI-RS/TRS.

When there is a predetermined termination time of the CSI-RS/TRS transmission, the operation of receiving the information indicating that the CSI-RS/TRS transmission is terminated may be skipped.

For a method proposed in the present disclosure, some of the following methods may be selected and applied. The methods may be operated independently without a separate combination thereof, or may be operated in a manner that one or more methods are combined and connected. Some terms, symbols, orders, and the like used for the description of the disclosure may be replaced with other terms, symbols, orders, and the like as long as the principle of the disclosure is maintained.

Hereinafter, an arbitrary structure utilizing CSI-RS/TRS in an idle/inactive mode is illustrated and described as an example in order to describe the principle of the present disclosure. However, it should be noted that the proposed method does not specifically limit the operation mode of the UE or the type of a reference signal unless stated otherwise. Therefore, it is apparent that the methods proposed in the present disclosure may be applied to all transmission/reception modes of the UE and reference signal types as long as the principle of the invention is not violated, even when there is no separate explanation.

Examples of the present disclosure are described below based on the NR system to explain the principle of the disclosure, but the proposed methods are not intended to specify and limit the transmission and reception type of NR unless stated otherwise. Therefore, it is apparent that the proposed methods are applicable to all wireless communication transmission and reception structures unless the principle of the disclosure is violated.

(Proposal 1)

In Proposal 1, a method for periodically configuring CSI-RS/TRS (resources) for a UE in the idle/inactive mode is proposed. In this case, the configuration of the periodic CSI-RS/TRS may be transmitted by RRC information transmitted by the BS, and may include information about a periodicity and a slot offset. As will be described later, SIBx broadcast by the BS may also be understood as an example of the RRC information.

For example, after configuring a CSI-RS/TRS for UEs in the idle/inactive mode through RRC, the BS may transmit the CSI-RS/TRS based on the periodicity and slot offset from a predetermined time (e.g., a start position predetermined between the UE and the BS). When the UE determines that the CSI-RS/TRS for UEs in the idle/inactive mode will be transmitted through RRC information and checks the periodicity and slot offset information for the transmission, it may expect/assume the CSI-RS/TRS from the predetermined start position according to the periodicity and slot offset.

CSI-RS/TRS Configuration/Reconfiguration Through RRC (or SIB)

For example, in Proposal 1, the RRC information may be information acquired by the UE in a connected mode. Even after switching from the connected mode to the idle/inactive mode, the UE may maintain at least the CSI-RS/TRS configuration without releasing (or discarding) the configuration. Thereby, at least a part of the CSI-RS/TRS configuration acquired in the connected mode may be reused in the idle/inactive mode. In this case, a separate overhead may not be caused in signaling the idle/inactive mode CSI-RS/TRS configuration or the signaling overhead may be minimized. In addition, from the perspective of the network, the CSI-RS/TRS that may be used in the connected mode may be operated for UEs in the idle/inactive mode, and accordingly overhead of the reference signal may be reduced. For example, from the perspective of the network, at least a part of the connected mode CSI-RS/TRS may be reused as at least a part of the idle/inactive mode CSI-RS/TRS.

Alternatively, in Proposal 1, at least a part of the RRC information may be configured using higher layer signaling, such as SIB, that the UE may acquire even in the idle/inactive mode. In this case, the UE may acquire CSI-RS/TRS information even without accessing the connected mode in a cell. In addition, when the BS intends to change the transmission periodicity or pattern of the CSI-RS/TRS, UEs in the idle/inactive mode may be allowed to acquire information about the changed transmission periodicity or pattern of the CSI-RS/TRS.

As an example, when the BS intends to provide configuration/reconfiguration information about periodic CSI-RS/TRS transmission for a UE in the idle/inactive mode, the change of the SIB may be indicated using the systemInfoModification bit included in a short message of paging (e.g., a short message included in paging DCI or a short message included in PEI as proposed below). When the idle/inactive mode periodic CSI-RS/TRS configuration is provided through the SIB, the change in the idle/inactive mode periodic CSI-RS/TRS configuration corresponds to a change in a part of the SIB, and thus the BS may notify the change in the SIB caused by the change in the Idle/Inactive mode periodic CSI-RS/TRS configuration through the short message field in the DCI/PEI. The BS may provide information related to the CSI-RS/TRS (or scheduling information about the SIB including the information) through SIB1 after transmitting the short message.

From the UE perspective, the UE may acquire DCI scrambled with a P-RNTI through monitoring of the CSS. When the UE determines that the systemInfoModification bit is set to 1 in the short message field, it may check SIB1 and acquire CSI-RS/TRS related information (or scheduling information for the SIB including the information).

For example, when the UE determines that configuration/reconfiguration of the CSI-RS/TRS is necessary, it may make a request for the same to the BS through a RACH procedure and then acquire the CSI-RS/TRS related information according to information configured by the BS. When the BS receives information requested by a specific UE, the BS may provide scheduling information for acquiring a CSI-RS/TRS to the UE and provide related information through a scheduled resource.

For example, when information about the CSI-RS/TRS used by UEs in the idle/inactive mode is provided only by SIB (e.g., the information about the CSI-RS/TRS that the UE receives in the connected mode is not reused in the idle/inactive mode or it is not provided), the BS may specifically indicate the position of a time resource (e.g., slot) through which the CSI-RS/TRS is transmitted. The parameter(s) indicating the position of the slot may include values of a periodicity and a slot offset, or an offset value for a PO monitored by a specific UE group (or a PDSCH transmission position that is the same as the PO or scheduled by the PO) may be indicated.

Indication of Start/Termination of CSI-RS/TRS Transmission Based on RRC (or SIB)

As an example, a method in which the start and termination of periodic CSI-RS/TRS transmission for a UE in the idle/inactive mode is indicated by RRC (or SIB) is proposed. When the BS intends to start transmission of a new periodic CSI-RS/TRS for the UE in the idle/inactive mode, it may indicate the same through RRC (or SIB).

Termination of periodic CSI-RS/TRS transmission may also be determined by the BS. In this case, the BS may deliver information about the termination of the periodic CSI-RS/TRS using the SIB. The UE may acquire the information about the termination of the periodic CSI-RS/TRS through the SIB.

The UE may determine a start (or termination) time at which the transmission of the CSI-RS/TRS may be expected, based on the information related to the start/termination of the periodic CSI-RS/TRS.

As a specific method by which the BS notifies the UE of the start/termination time of the periodic CSI-RS/TRS for the UE in the idle/inactive mode, and the UE acquires, from the BS, the start/end time of an interval in which the UE may expect to receive the periodic CSI-RS/TRS, the method using paging and RACH described in relation to the CSI-RS/TRS information configuration/reconfiguration method using RRC (or SIB) may be applied.

According to Proposal 1, in a situation where stable transmission of CSI-RS/TRS is allowed for a long period, the overhead of the BS may be reduced by reducing a separate configuration for activation/deactivation of the CSI-RS/TRS, and the operation of the UE acquiring information related to the CSI-RS/TRS may be simplified.

(Proposal 2)

Proposal 2 proposes a method of semi-persistently configuring a CSI-RS/TRS (resources) for a UE in the idle/inactive mode.

The semi-persistent CSI-RS/TRS according to Proposal 2 may also correspond to an example of periodic resource allocation/transmission. According to Proposal 2, the start of transmission of the CSI-RS/TRS (or availability for CSI-RS/TRS resources) may be indicated through separate MAC (L2) or PHY (L1) signaling after the CSI-RS/TRS configuration.

The BS may transmit the configuration of an idle/inactive mode CSI-RS/TRS through higher layer signaling (e.g., RRC). The configuration of the CSI-RS/TRS may include information about a periodicity and slot offset of the CSI-RS/TRS. SIBx broadcast by the BS may also be understood as an example of RRC information. After the BS signals the configuration of the CSI-RS/TRS for UEs in the idle/inactive mode through higher layer signaling (e.g., RRC), it may transmit triggering information indicating CSI-RS/TRS transmission (e.g., information indicating that the CSI-RS/TRS may be received in the idle/inactive mode using the configuration of the CSI-RS/TRS) to the UE. Thereafter, the BS may transmit the CSI-RS/TRS according to the periodicity and slot offset from a specific time (e.g., a predetermined time after transmitting the triggering information or from a predetermined start position). The UE may determine that CSI-RS/TRS transmission for UEs in the idle/inactive mode is supportable (or the corresponding resource is configured) through RRC information, and then acquire the triggering information indicating the start of the CSI-RS/TRS transmission. Thereafter, the UE may expect/assume the CSI-RS/TRS transmission according to the periodicity and slot offset (from the predetermined start position).

CSI-RS/TRS Configuration/Reconfiguration Through RRC (or SIB)

For example, in Proposal 2, the RRC information may be acquired by the UE in the connected mode, as in the case of Proposal 1. Even after switching from the connected mode to the idle/inactive mode, the UE may maintain at least the CSI-RS/TRS configuration without releasing (or discarding) the configuration. Thereby, at least a part of the CSI-RS/TRS configuration acquired in the connected mode may be reused in the idle/inactive mode. In this case, a separate overhead may not be caused in signaling the idle/inactive mode CSI-RS/TRS configuration or the signaling overhead may be minimized. In addition, from the perspective of the network, the CSI-RS/TRS that may be used in the connected mode may be operated for UEs in the idle/inactive mode, and accordingly overhead of the reference signal may be reduced. For example, from the perspective of the network, at least a part of the connected mode CSI-RS/TRS may be reused as at least a part of the idle/inactive mode CSI-RS/TRS.

For example, in Proposal 2, at least a part of the RRC information may be configured using higher layer signaling, such as SIB, that the UE may acquire even in the idle/inactive mode, as in the case of Proposal 1. In this case, the UE may acquire CSI-RS/TRS information even without accessing the connected mode in a cell. In addition, when the BS intends to change the transmission periodicity or pattern of the CSI-RS/TRS, UEs in the idle/inactive mode may be allowed to acquire information about the changed transmission periodicity or pattern of the CSI-RS/TRS.

As an example, when the BS intends to provide configuration/reconfiguration information about periodic CSI-RS/TRS transmission for a UE in the idle/inactive mode, the change of the SIB may be indicated using the systemInfoModification bit included in a short message of paging (e.g., a short message included in paging DCI or a short message included in PEI as proposed below). When the idle/inactive mode periodic CSI-RS/TRS configuration is provided through the SIB, the change in the idle/inactive mode periodic CSI-RS/TRS configuration corresponds to a change in a part of the SIB, and thus the BS may notify the change in the SIB caused by the change in the Idle/Inactive mode periodic CSI-RS/TRS configuration through the short message field in the DCI/PEI. The BS may provide information related to the CSI-RS/TRS (or scheduling information about the SIB including the information) through SIB1 after transmitting the short message.

From the UE perspective, the UE may acquire DCI scrambled with a P-RNTI through monitoring of the CSS. When the UE determines that the systemInfoModification bit is set to 1 in the short message field, it may check SIB1 and acquire CSI-RS/TRS related information (or scheduling information for the SIB including the information).

For example, when the UE determines that configuration/reconfiguration of the CSI-RS/TRS is necessary, it may make a request for the same to the BS through a RACH procedure and then acquire the CSI-RS/TRS related information according to information configured by the BS. When the BS receives information requested by a specific UE, the BS may provide scheduling information for acquiring a CSI-RS/TRS to the UE and provide related information through a scheduled resource.

For example, when information about the CSI-RS/TRS used by UEs in the idle/inactive mode is provided only by SIB (e.g., the information about the CSI-RS/TRS that the UE receives in the connected mode is not reused in the idle/inactive mode or it is not provided), the BS may specifically indicate the position of a time resource (e.g., slot) through which the CSI-RS/TRS is transmitted. The parameter(s) indicating the position of the slot may include values of a periodicity and a slot offset, or an offset value for a PO monitored by a specific UE group (or a PDSCH transmission position that is the same as the PO or scheduled by the PO) may be indicated.

Indication of Start/Termination of CSI-RS/TRS Transmission

A method for activation/deactivation of an idle/inactive CSI-RS/TRS configured through RRC (or SIB) is proposed.

(Proposal 2-1) MAC CE-Based Activation/Deactivation

In Proposal 2-1, it is proposed that a MAC control element (CE) be used to activate/deactivate a semi-persistent CSI-RS/TRS for a UE in the idle/inactive mode configured through RRC (or SIB). In this case, the BS may indicate CSI-RS/TRS transmission through the MAC CE before transmitting a CSI-RS/TRS that may be expected by the UE in the idle/inactive mode. In this case, the UE receiving the semi-persistent CSI-RS/TRS for the UE in the idle/inactive mode configured through the RRC (or SIB) may determine whether the CSI-RS/TRS configured through the MAC CE is transmitted.

As a specific example of Proposal 2-1, the UE may be configured to expect that the MAC CE may be received through a paging procedure. In this case, the BS may utilize the paging procedure to inform that CSI-RS/TRS transmission is to be activated/deactivated on a semi-persistent CSI-RS/TRS resource preconfigured through RRC. The UE may monitor paging. When information about activation/deactivation of the CSI-RS/TRS transmission is acquired in the MAC CE acquired in the paging procedure, the UE may expect the semi-persistent CSI-RS/TRS to be received on the resource configured through RRC.

As a specific method in which the paging procedure is used, activation/deactivation information about semi-persistent CSI-RS/TRS transmission may be included in a PDSCH scheduled by the paging DCI in the form of MAC CE. In this case, a 1-bit indicator for determining whether the MAC CE is included in the PDSCH may be included in the DCI scrambled to the P-RNTI. Specifically, the 1-bit indicator may be included in the short message field. In this case, when the UE detects DCI scrambled by the P-RNTI and determines that the activation/deactivation information about the semi-persistent CSI-RS/TRS may be transmitted through MAC CE based on the 1-bit indicator, the same DCI it may expect to receive the MAC CE on the PDSCH scheduled through the DCI.

However, when the activation/deactivation is performed by transmitting the MAC CE on the PDSCH scheduled by the paging DCI as in the proposed method, legacy UEs not expecting semi-persistent CSI-RS/TRS transmission while monitoring the same paging occasion (PO) may perform unnecessary PDSCH decoding or misunderstand that incorrect information has been transmitted. In order to prevent this issue, the proposed method may be configured to be applied only when the bit of the short message indicator has a value of '10' (i.e. "Only Short Message is present in the DCI" is indicated by the short message indicator based on Rel-16 NR). In this case, the UE having a capability for the short message for the MAC CE may decode the PDSCH including the MAC CE, assuming that there is scheduling of the PDSCH, and the legacy UE may assume that DCI fields related to scheduling of the PDSCH are reserved bits according to a rule for interpretation of the short message indicator.

When the method proposed in Proposal 2-1 is used, information about a resource set ID of the CSI-RS/TRS may be included in the MAC CE including the activation/deactivation information about the semi-persistent CSI-RS/TRS. In this case, the BS may configure a plurality of resource sets through RRC (or SIB), and may be configured to indicate one resource set ID (or more) through the MAC CE. In this case, the UE may receive the configuration of the plurality of resource sets through RRC (or SIB), and may identify actually used resource set ID through MAC CE and apply the same. This operation may be intended to increase network scheduling flexibility by allowing the BS to determine a transmission pattern of the CSI-RS/TRS suitable for a network environment.

When the method proposed in Proposal 2-1 is used, information about a duration for which the CSI-RS/TRS transmission is maintained may be included in the MAC CE including the activation/deactivation information about the semi-persistent CSI-RS/TRS. The duration may be configured to start based on the transmission time of the MAC CE (or the PDCCH for scheduling the MAC CE). The UE may keep expecting the semi-persistent CSI-RS/TRS transmission after the transmission time, and may not expect the CSI-RS/TRS any longer when the configured duration elapses. This configuration may be intended to reduce an issue that occurs when the MAC CE for deactivation is missing while the UE continues to expect CSI-RS/TRS after acquiring the MAC CE for activation. In addition, when the MAC CE for activation is transmitted, the BS may be allowed to terminate the transmission of the CSI-RS/TRS without a separate MAC CE transmission for deactivation. Accordingly, a network overhead saving gain may be achieved.

(Proposal 2-2) Paging Message-Based Activation/Deactivation (Via RRC)

Proposal 2-2 proposes a method of using a paging message (PDSCH) of an RRC layer to activate/deactivate a (semi-persistent) CSI-RS/TRS for a UE in the idle/inactive mode configured through the RRC (or SIB). In this case, the BS may indicate transmission of the CSI-RS/TRS that may be expected by the UE in the idle/inactive mode by a paging message through RRC signaling before transmitting the CSI-RS/TRS. In this case, the UE receiving the semi-persistent CSI-RS/TRS for the UE in the idle/inactive mode configured through RRC (or SIB) may determine whether the CSI-RS/TRS configured by the paging message through RRC signaling is transmitted.

As a specific example of Proposal 2-2, the UE may receive a configuration of an RNTI for CSI-RS/TRS transmission from the BS. When the information identified through a field (i.e. ue-Identity) for the ID of the UE in the paging message is the configured RNTI information, the UE may expect activation information about the CSI-RS/TRS. In this case, the RNTI information may be configured for the UE through the RRC (or SIB) transmitted by the BS. A plurality of RNTIs for CSI-RS/TRS transmission may be configured in one cell. As an example, each of the plurality of RNTIs may be used to separately indicating each resource set ID. Alternatively, at least one RNTI may indicate deactivation of the semi-persistent CSI-RS/TRS transmission. In this case, the BS may increase scheduling flexibility for the transmission pattern of the semi-persistent CSI-RS/TRS according to the situation.

When the method proposed in Proposal 2-2 is used, information about a duration for which the CSI-RS/TRS transmission is maintained may be included in the paging message including the semi-persistent CSI-RS/TRS activation/deactivation information. Specifically, the duration may be configured to use a distinguishable RNTI through identification through a field (i.e. ue-Identity) for the ID of the UE described above. To this end, the BS may define a duration corresponding to each RNTI used for the semi-persistent CSI-RS/TRS and transmit the through RRC (or SIB), and the UE may be configured to acquire the same and operate. The duration may be configured to start based on the transmission time of the PDSCH including the paging message (or the PDCCH for scheduling the paging message). The UE may keep expecting the semi-persistent CSI-RS/TRS transmission after the transmission time, and may not expect the CSI-RS/TRS any longer when the configured duration elapses. This configuration may be intended to reduce an issue that occurs when the paging message for deactivation is missing while the UE continues to expect CSI-RS/TRS after acquiring the paging message for activation. In addition, when the paging message for activation is transmitted, the BS may be allowed to terminate the transmission of the CSI-RS/TRS without a separate paging transmission for deactivation. Accordingly, a gain of network overhead saving may be achieved.

The method proposed in Proposal 2-2 may reduce the transmission/reception overhead for a separate configuration such as transmission and acquisition of an SIB. Accordingly, the latency occurring in the activation/deactivation operation may be reduced. Also, resource overhead may be reduced on the BS side and a power saving effect may be obtained on the UE side. In addition, since the form of the paging message used by legacy UEs is reused, the same PDSCH may be shared with the legacy UEs, which is advantageous in terms of coexistence.

(Proposal 2-3) DCI-Based Activation/Deactivation

Proposal 2-3 proposes a method of using DCI to activate/deactivate a CSI-RS/TRS for a UE in the idle/inactive mode configured through the RRC (or SIB). For example, a CSI-RS/TRS configuration/transmission/resource configured for the UE may be activated based on DCI. After being activated, the CSI-RS/TRS configuration/transmission/resource may be deactivated based on the DCI. In this way, before transmitting a CSI-RS/TRS that may be expected by the UE in the idle/inactive mode, the BS may indicate activation/deactivation (i.e., availability) of the CSI-RS/TRS through the DCI. The UE may receive the (semi-persistent) CSI-RS/TRS configuration for the UE in the idle/inactive mode through RRC (or SIB), and then determine whether the configured CSI-RS/TRS is transmitted based on the received DCI.

As a specific example of use of the DCI-based activation/deactivation according to Proposal 2-3, the PDCCH carrying the DCI indicating activation/deactivation may have a CRC scrambled with a P-RNTI. The UE may acquire activation/deactivation information about semi-persistent CSI-RS/TRS through the PDCCH carrying the DCI CRC-scrambled with the P-RNTI. Using the P-RNTI for the DCI indicating activation/deactivation as described above does not require the UE to monitor a separate (additionally configured) search space to acquire the activation/deactivation information about the semi-persistent CSI-RS/TRS, and therefore it may be advantageous in terms of power saving of the UE. Paging DCI transmitted based on the P-RNTI and a search space therefor are already defined, and the UE needs to perform blind detection based on the P-RNTI for the paging DCI in the search space. Accordingly, transmitting the DCI indicating the activation/deactivation based on P-RNTI may be advantageous in terms of minimizing an increase in the processing burden on the UE and saving power of the UE. In addition, since the BS does not need to configure a separate PDCCH transmission for providing activation/deactivation information, there is an advantage in terms of network overhead saving. In addition, when the search space is not reserved exclusively for the DCI indicating the activation/deactivation, that is, when the search space for the paging DCI is reused for DCI transmission and reception indicating activation/deactivation, the efficiency of resource use may be improved.

As a more specific example of the embodiment in which the DCI scrambled with the P-RNTI is used to indicate activation/deactivation, the DCI indicating the activation/deactivation may include a short message field.

As an example, the short message field included in the DCI may be used in relation to indication of activation/deactivation of the CSI-RS/TRS. When there is no paging message to be transmitted by the BS, a state of a short message indicator for transmitting only a short message (e.g., in Rel-16 NR, Short Message indicator='10' means "Only Short Message is present in the DCI") may be used even for indication of the activation/deactivation of the CSI-RS/TRS. When Short Message indicator='10' in Rel-16 NR is reused to indicate the activation/deactivation of the CSI-RS/TRS, legacy UEs such as Rel-16 NR UEs may be prevented from attempting to perform unnecessary PDSCH detection due to the DCI.

In addition, as an example in which the short message field is used, 1 bit (additional, reserved, or existing 1 bit) in the short message field may be used to indicate the activation/deactivation of the CSI-RS/TRS. When activation of the CSI-RS/TRS is indicated through the 1 bit, the UE may expect that the CSI-RS/TRS will be transmitted based on the periodicity/offset until it receives separate deactivation information after receiving the DCI. When deactivation of the CSI-RS/TRS is indicated through the 1 bit, the UE may not expect transmission of the (semi-persistent) CSI-RS/TRS until it receives separate activation information after receiving the DCI.

As a more specific example, when there is a duration preconfigured through RRC (or SIB) (or defined by the standard), the UE expect that the CSI-RS/TRS will be transmitted for the duration from the time it acquires a 1-bit indication from the short message field. This configuration may be intended to reduce an issue that occurs when the UE misses the DCI for deactivation while continuing to expect the CSI-RS/TRS (e.g., semi-permanently) after acquiring the DCI for activation. In addition, when the DCI for activation is transmitted, the BS may be allowed to terminate the transmission of the CSI-RS/TRS without a separate transmission of paging DCI or the like for deactivation. Accordingly, a network overhead saving gain may be achieved.

As an example in which the short message field is used to indicate activation/deactivation, N bits may be used in the short message field, and a total of $2^N$ states may be used to indicate the activation/deactivation and a duration. In this case, $2^N-1$ states may be configured to express activation of the CSI-RS/TRS and express different $2^N-1$ durations. In addition, one state may be used for deactivation of the CSI-RS/TRS.

When a duration is dynamically indicated through the DCI as described above, more resources in the short message field may be used than when a single predetermined duration is used, and scheduling flexibility for the duration may be increased.

Alternatively, as an example in which the short message field is used to indicate the activation/deactivation, a total of $2^N$ states may be used to indicate the activation/deactivation and a resource set ID. For example, $2^N-1$ states may be configured to express activation of the CSI-RS/TRS and to express different $2^N-1$ resource set IDs, respectively. In addition, one state may be configured to be used for deactivation of the CSI-RS/TRS. Thereby, the BS may dynamically control the CSI-RS/TRS transmission pattern suitable for the network situation.

The duration signaling/indicating method proposed above and the resource set ID indication method may be used in combination (e.g., $2^N$ states may be used to express the activation/deactivation, duration and resource set ID at the same time).

According to Proposal 2, the BS may indicate activation/deactivation of the CSI-RS/TRS with low latency and overhead. Also, according to an embodiment, the BS may adjust the CSI-RS/TRS transmission pattern. The UE maintains and applies CSI-RS/TRS related information acquired once for a certain period of time. Accordingly, when reconfiguration of CSI-RS/TRS transmission occurs, a related information acquisition procedure may be simplified.

(Proposal 3)

Proposal 3 proposes a method of aperiodically configuring a CSI-RS/TRS for a UE in the idle/inactive mode. Here, the aperiodic configuration of the CSI-RS/TRS may provide a CSI-RS/TRS transmission allowed position by RRC transmitted by the BS. The BS may signal that it will transmit CSI-RS/TRS for UEs in the idle/inactive mode through RRC, and then deliver triggering information indicating the same to the UE before the CSI-RS/TRS transmission. Then, it may transmit the CSI-RS/TRS according to the predetermined transmission allowed position. The UE may determine that the CSI-RS/TRS for the idle/inactive mode UEs may be transmitted based on the RRC information, and then acquire the triggering information indicating the same before the CSI-RS/TRS transmission. Thereafter, it may assume that the CSI-RS/TRS may be expected according to the predetermined transmission allowed position.

CSI-RS/TRS Configuration/Reconfiguration Through RRC (or SIB)

In Proposal 3, the RRC information may be acquired by the UE in a connected mode state. Even after switching from the connected mode to the idle/inactive mode, the UE may maintain at least the CSI-RS/TRS configuration without releasing (or discarding) the configuration. Thereby, at least a part of the CSI-RS/TRS configuration acquired in the connected mode may be reused in the idle/inactive mode. In this case, a separate overhead may not be caused in signaling the idle/inactive mode CSI-RS/TRS configuration or the signaling overhead may be minimized. In addition, from the perspective of the network, the CSI-RS/TRS that may be used in the connected mode may be operated for UEs in the idle/inactive mode, and accordingly overhead of the reference signal may be reduced. For example, from the perspective of the network, at least a part of the connected mode CSI-RS/TRS may be reused as at least a part of the idle/inactive mode CSI-RS/TRS.

At least a part of the RRC information may be configured using higher layer signaling, such as SIB, that the UE may acquire even in the idle/inactive mode. In this case, the UE may acquire CSI-RS/TRS information even without accessing the connected mode in a cell. In addition, when the BS intends to change the transmission periodicity or pattern of the CSI-RS/TRS, UEs in the idle/inactive mode may be allowed to acquire information about the changed transmission periodicity or pattern of the CSI-RS/TRS.

As an example, when the BS intends to provide configuration/reconfiguration information about periodic CSI-RS/TRS transmission for a UE in the idle/inactive mode, the change of the SIB may be indicated using the systemInfoModification bit included in a short message of paging (e.g., a short message included in paging DCI or a short message included in PEI as proposed below). When the idle/inactive mode periodic CSI-RS/TRS configuration is provided through the SIB, the change in the idle/inactive mode periodic CSI-RS/TRS configuration corresponds to a change in a part of the SIB, and thus the BS may notify the change in the SIB caused by the change in the Idle/Inactive mode periodic CSI-RS/TRS configuration through the short message field in the DCI/PEI. The BS may provide information related to the CSI-RS/TRS (or scheduling information about the SIB including the information) through SIB1 after transmitting the short message.

From the UE perspective, the UE may acquire DCI scrambled with a P-RNTI through monitoring of the CSS. When the UE determines that the systemInfoModification bit is set to 1 in the short message field, it may check SIB1 and acquire CSI-RS/TRS related information (or scheduling information for the SIB including the information).

For example, when the UE determines that configuration/reconfiguration of the CSI-RS/TRS is necessary, it may make a request for the same to the BS through a RACH procedure and then acquire the CSI-RS/TRS related information according to information configured by the BS. When the BS receives information requested by a specific UE, the BS may provide scheduling information for acquiring a CSI-RS/TRS to the UE and provide related information through a scheduled resource.

For example, when information about the CSI-RS/TRS used by UEs in the idle/inactive mode is provided only by SIB (e.g., the information about the CSI-RS/TRS that the UE receives in the connected mode is not reused in the idle/inactive mode or it is not provided), the BS may specifically indicate the position of a time resource (e.g., slot) through which the CSI-RS/TRS is transmitted. The parameter(s) indicating the position of the slot may include values of a periodicity and a slot offset, or an offset value for a PO monitored by a specific UE group (or a PDSCH transmission position that is the same as the PO or scheduled by the PO) may be indicated.

Indicating Whether CSI-RS/TRS is Transmitted

In the method proposed in Proposal 3, a method in which DCI indicates whether aperiodic CSI-RS/TRS transmission for a UE in the idle/inactive mode is performed is proposed. When the BS intends to transmit a new aperiodic CSI-RS/TRS for a UE in the idle/inactive mode, it may indicate the transmission through DCI. In this case, the transmission of the aperiodic CSI-RS/TRS may correspond to one transmission occasion. In this case, the UE may determine a time when CSI-RS/TRS transmission may be expected based on the information in the received DCI.

As a specific example of Proposal 3, the UE may acquire information about a transmission time of the aperiodic CSI-RS/TRS through the PDCCH carrying the DCI in which the CRC is scrambled to a P-RNTI. Thus, the UE is not required to monitor a separate (additionally configured) search space to acquire information about whether the aperiodic CSI-RS/TRS is transmitted. Accordingly, there may be an advantage in terms of power saving of the UE. Paging DCI transmitted based on the P-RNTI and a search space therefor are already defined, and the UE needs to perform blind detection based on the P-RNTI for the paging DCI in the search space. Accordingly, transmitting the DCI indicating whether aperiodic CSI-RS/TRS transmission is performed based on the P-RNTI may be advantageous in terms of minimizing an increase in the processing burden on the UE and saving power of the UE. In addition, since the BS does not need to configure a separate PDCCH transmission for providing information about whether the transmission is performed, there is an advantage in terms of network overhead saving. In addition, when the search space is not reserved exclusively for the DCI indicating whether the aperiodic CSI-RS/TRS transmission is performed, that is, when the search space for the paging DCI is reused for transmission and reception of the DCI indicating whether the aperiodic CSI-RS/TRS transmission is performed, the efficiency of resource use may be improved.

When the method proposed in Proposal 3 is used and whether the aperiodic CSI-RS/TRS is transmitted is determined through the DCI scrambled with the P-RNTI, the transmission time of the aperiodic CSI-RS/TRS may be determined as a relative position to the next PO, PO #n after transmission of the aperiodic CSI-RS/TRS is indicated to the UE through the DCI. The relative position may be represented by an offset from PO #n. For example, the BS may transmit an aperiodic CSI-RS/TRS at a time position that is earlier than PO #n by an offset. The UE may expect the aperiodic CSI-RS/TRS at the position earlier than PO #n by the offset. Such configuration may be intended to provide a structure in which the UE may utilize the CSI-RS/TRS instead of the SSB in the CSS monitoring operation for paging. In addition, according to the configuration, when the gap (d1=offset) between the transmission time of the CSI-RS/TRS and PO #n is shorter than the gap (d2) between an SSB (e.g., the last SSB positioned before PO #n) and PO #n (i.e., d1<d2), the waiting time from the time when the UE performs (CSI-RS/TRS or SSB-based) time/frequency tracking until monitoring PO # starts may be reduced, and thus a power saving gain may be obtained. In a system in which a WUS (e.g., a PEI signal or channel transmitted to the UE by the BS to pre-indicate whether a CSS for paging needs to be monitored) is used, the transmission position of the WUS (corresponding to PO #n in place of PO #n) may be used as a reference position for determining transmission of the aperiodic CSI-RS/TRS.

As a specific method in which DCI scrambled with a P-RNTI is used when the method proposed in Proposal 3 is used, a short message field in the DCI may be used. When there is no paging message to be transmitted by the BS, a state of a short message indicator for transmitting only a short message (e.g., in Rel-16 NR, Short Message indicator='10' means "Only Short Message is present in the DCI") may be used even for indication of the transmission of the CSI-RS/TRS. When Short Message indicator='10' in Rel-16 NR is reused to indicate the transmission of the CSI-RS/TRS, legacy UEs such as Rel-16 NR UEs may be prevented from attempting to perform unnecessary PDSCH detection due to the DCI.

In addition, as an example in which the short message field is used, 1 bit (additional, reserved, or existing 1 bit) in the short message field may be used to indicate the transmission of the CSI-RS/TRS. When it is indicated that the CSI-RS/TRS is transmitted through the 1 bit, the UE may expect transmission of the CSI-RS/TRS at a position relative to the next PO after the time when the DCI is received.

According to the method proposed in Proposal 3, the BS may fully dynamically control transmission of the CSI-RS/TRS, and it is not necessary to reserve resources for transmission of the CSI-RS/TRS. Accordingly, scheduling flexibility may be enhanced. In addition, since the UE may expect transmission of the CSI-RS/TRS only when DCI is acquired, the burden of missing DCI may be small.

(Proposal A) WUS (PEI)/Paging DCI-Based Indication

DCI-based CSI-RS/TRS indication (e.g., activation/availability/transmission indication) has been proposed in the examples described above. A more specific example of the DCI-based CSI-RS/TRS indication is proposed in Proposal A.

Proposal A proposes a method in which information is configured/set in each signal/channel provide CSI-RS/TRS information for a UE in the idle/inactive mode when WUS and paging DCI are available. The configuration of resource information in the time/frequency/code domain of the CSI-RS/TRS for the UE may be signaled through RRC transmitted by the BS. The configuration may provide a position where the CSI-RS/TRS may be transmitted. The BS may signal through RRC that a CSI-RS/TRS for idle/inactive mode UEs will be transmitted, and then transmit information indicating CSI-RS/TRS transmission to the UE (before the CSI-RS/TRS transmission). Thereafter, the BS may perform the CSI-RS/TRS transmission. For example, the CSI-RS/TRS transmission may be performed at a predetermined transmission allowed position (between the UE and the BS). The UE may determine that a CSI-RS/TRS for UEs in the idle/inactive mode is configured based on the RRC information, and then acquire information indicating the CSI-RS/TRS transmission. Thereafter, it may expect/assume the CSI-RS/TRS (based on the predetermined transmission allowed position).

In Proposal A, when both the CSI-RS/TRS and the WUS are configured for the idle/inactive mode UEs, the UE may expect that information indicating whether the CSI-RS/TRS is transmitted (hereinafter, availability indication) will be included in both the WUS and the paging DCI.

As an example, the WUS and the paging DCI may be allowed to include different availability indication information. The method proposed in the present disclosure may also be applied in the case where there is a common availability indication in two different signals/channels. For example, the information about the availability indication indicated through the WUS may include information about availability indication for a CSI-RS/TRS that may be configured in a duration between the time when the UE acquires the WUS and the position of a related PO (i.e. the PO on which the WUS is indicated).

Here, the information about the availability indication may be limited to an indication of the CSI-RS/TRS to which the QCL assumption for the same beam direction as the WUS, for example, the same SSB index is applied. As a specific method, when the WUS is configured with DCI and 1 bit included in the DCI provides information about an indication for the CSI-RS/TRS, the CSI-RS/TRS indicated by the 1 bit may be limited to a CSI-RS/TRS resource having the same QCL assumption as the WUS among the CSI-RS/TRS resources, and/or the indicated time duration may be limited to a duration between the WUS and the PO. In this case, the UE may select or have already selected the received SSB beam index in the step of monitoring the PEI, or monitor only the PO corresponding to the selected SSB beam direction. Accordingly, only the necessary TRS availability indication information expected to be used by the UE is provided to reduce signaling overhead. The information about the availability indication indicated through the WUS may include information indicating a specific CSI-RS/TRS resource (or resource set) and/or information about a time window for the duration between the WUS and the PO.

As proposed in the examples above, the information about the availability indication indicated through the paging DCI may include availability indication information for a CSI-RS/TRS that may be configured within a certain period (e.g., a period of one or more DRX cycles or multiple slots/frames) from the time the UE acquires the paging DCI. In this case, the information about the availability indication may be provided regardless of the beam direction of the PDCCH on which the paging DCI is transmitted (i.e. QCL assumption for the transmitted and received paging PDCCH). In a specific method, when N bits in the paging DCI are used to indicate the availability of the CSI-RS/TRS, the CSI-RS/TRS resource corresponding to the N bits may be configured through a higher layer, and/or the indicated time duration may be determined by the standard or a size thereof indicated through the higher layer may be applied (or one of the sizes determined by the standard or indicated through the higher layer may be selected by the paging DCI) for the following reasons. When the UE acquires the availability information about the CSI-RS/TRS through the paging DCI, it may expect that the acquired information will be applied from the next DRX cycle. In addition, the beam direction favorable to the UE may change and be and unpredictable due to an influence of the change in the radio channel environment during the DRX cycle.

FIG. 10 illustrates RS availability indication in the idle/inactive mode according to an embodiment of the present disclosure.

Referring to FIG. 10, the UE may receive a PEI configured based on a WUS, for example, DCI. The PEI configured based on the DCI may be transmitted on a PDCCH in which the CRC is scrambled with a first RNTI. The WUS may indicate that the UE needs to monitor the paging DCI on PO #n associated with the WUS.

The UE attempts to detect paging DCI by monitoring the PDCCH on PO #n. The paging DCI may be transmitted on the PDCCH in which the CRC is scrambled with a second RNTI. The second RNTI may be a P-RNTI. The first RNTI may be the same P-RNTI as the second RNTI, or may be a different (different type) RNTI from the second RNTI.

Each of the WUS and the paging DCI may include availability indication information about an RS (e.g., CSI-RS/TRS) for the RRC idle/inactive mode. As an example, both the WUS and the paging DCI may include availability indication information about the same (type/configuration) RS. However, the WUS and the paging DCI may be allowed to include availability indication information about different (types/configuration) RSs. RSs A01, A02 and A03 shown in FIG. 10 may all be the same (type/configuration) RS, or may be different (type/configuration) RSs.

As described above, the WUS may include RS availability indication for time duration A, which is a time duration before related PO #n. As an example, the WUS may include availability indication information about an RS A01 that is transmitted through the same beam as the WUS or for which QCL assumption may be made. The WUS may not include availability indication information about an RS A02 that is transmitted through a different beam from the WUS or for which QCL assumption may not be made.

Paging DCI may include availability indication information about RSs A03 in time duration B. As an example, time duration B may correspond to a period of one or more DRX cycles or multiple slots/frames (starting from the time when the paging DCI is acquired). As an example, the paging DCI may provide availability indication information about the RSs A03 regardless of the beam direction or QCL assumption of the RSs A03 in time duration B.

The information about the availability indication provided through the WUS and the paging DCI may be distinguished as described above to increase the power saving gain of the UE and reduce unnecessary signaling overhead in consideration of the characteristics and use of each transmission signal/channel.

FIG. 11 illustrates a DCI-based RS availability indication method according to an embodiment of the present disclosure. In FIG. 11, it is assumed that a plurality of RNTIs including RNTI #1 and RNTI #2 is provided in relation to RS availability indication.

Referring to FIG. 11, the UE performs PDCCH monitoring based on the RNTI(s) (B01). For example, when a plurality of RNTIs is configured for a search space, the UE may perform blind detection of PDCCH candidates based on the plurality of RNTIs. For example, the UE may check the CRC of PDCCH candidate #1 with a first RNTI and check the CRC of PDCCH candidate #2 with a second RNTI. Since only the RNTI used for the CRC check is changed for the same PDCCH candidate, the processing burden of the UE related to blind decoding may be minimized. When the CRC check is successful, the UE may determine that DCI has been transmitted, that is, the PDCCH has been detected (B05) based on the RNTI.

When the PDCCH is detected based on the first RNTI, the UE may attempt RS reception according to a first RS reception procedure (B15). When the PDCCH is detected based on the second RNTI, the UE may attempt RS reception procedure according to a second RS reception procedure (B20).

Both the first RS reception procedure and the second RS reception procedure may be related to the same (type/configuration/usage of) RSs, or may be related to different (types/configurations/usages of) RSs according to embodiments.

The first RS reception procedure/second RS reception procedure may be performed based on the RS availability indication included in DCI based on the RNTI.

For example, the DCI based on the first RNTI may be PEI (WUS), and the DCI based on the second RNTI may be paging DCI.

In a specific method applicable to Proposal A, when availability indications for a plurality of pieces of information can be transmitted through the WUS, at least one piece of information is used to notify that the information about the availability indication will be provided in the paging DCI. For example, when the WUS (PEI) information is configured through DCI and transmitted/received on the PDCCH, (at least) 1 bit of the DCI may be used to indicate that the UE may expect availability indication information about a TRS (through the paging DCI) at a position of an associated PO where the UE may be instructed to monitor through the WUS detection. This may allow UEs monitoring the PEI to acquire information about the availability indication provided only through the paging DCI by monitoring the PO even when there is no paging message to receive. In this case, when the UE is instructed to monitor the PO for receiving CSI-RS/TRS information through the WUS, but it is indicated that a paging message for the UE is not transmitted/received, the UE may perform only blind detection of the PDCCH at the position of the PO and skip a preliminary operation for PDSCH reception, thereby obtaining a power saving gain. The DCI bit indicating the proposed PO monitoring may be used not only to notify the acquisition of CSI-RS/TRS information in the paging DCI, but also to is indicate other information (e.g., SI update indication, ETWS/CMAS notification, etc.) that may be transmitted on the PO.

As an embodiment in which Proposal A is applied, when the WUS is configured with N-bit DCI, (at least) 2 bits included therein may be used for Proposal A. Of the (at least) 2 bits, 1 bit is used to indicate availability of a CSI-RS/TRS for which the same QCL assumption as the WUS may be made in the duration between the WUS and the PO, and the other 1 bit may be used to indicate monitoring of a paging PDCCH at the position of the PO.

Also, as an example of the paging DCI, N bits of the paging DCI may be used for Proposal A. To this end, reserved bits that are reserved in the paging DCI and/or reserved bits in the short message field may be used.

Figure 12:
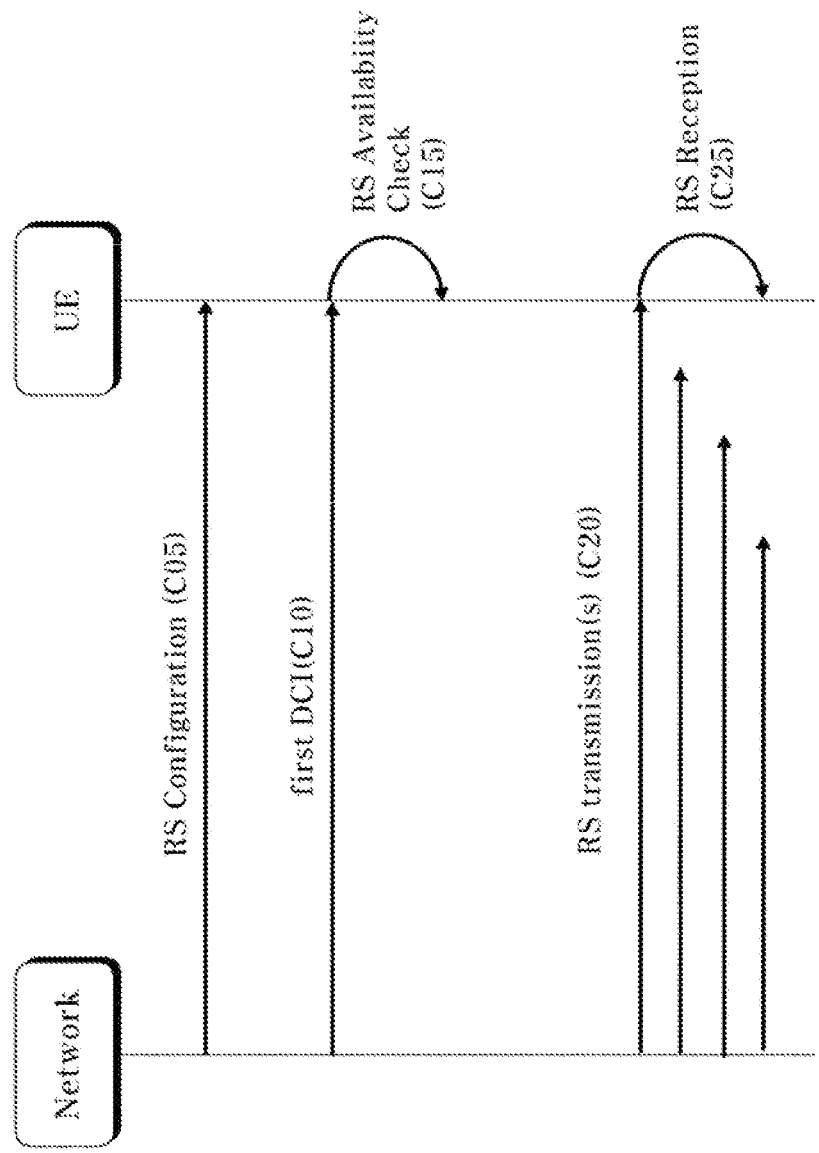
FIG. 12 illustrates a flow of a signal transmission/reception method according to an example of the present disclosure.

FIG. 12 illustrates a flow of a signal transmission/reception method according to an embodiment of the present disclosure. FIG. 12 is an application/implementation example of at least a part of the above-described proposals. Redundant descriptions thereof will be omitted and the above descriptions may be referred to as necessary.

Referring to FIG. 12, a BS may transmit a configuration for a reference signal for a UE in a radio resource control (RRC) idle mode or an RRC inactive mode (C05). The UE may acquire the configuration for the reference signal for the RRC idle mode or the RRC inactive mode.

The BS may transmit information indicating the availability of the configured reference signal (C10). The BS may transmit the information indicating the availability of the reference signal through a specific signal. The specific signal may be first downlink control information (DCI) carried by a physical downlink control channel (PDCCH) transmitted in the RRC idle mode or the RRC inactive mode.

The UE may determine the availability of the configured reference signal (C15). The UE may determine the availability of the reference signal based on a specific signal received from the BS. The specific signal may be first DCI carried by a PDCCH detected in the RRC idle mode or the RRC inactive mode.

The BS may transmit the reference signal to the UE in the RRC idle mode or the RRC inactive mode based on the availability of the reference signal and the acquired configuration for the reference signal (C20). The BS may periodically transmit the reference signal to the UE in the RRC idle mode or the RRC inactive mode based on the first DCI indicating that the reference signal is available.

The UE may receive the reference signal in the RRC idle mode or the RRC inactive mode based on the determination of the availability of the reference signal and the acquired configuration for the reference signal. Based on the first DCI indicating that the reference signal is available, the UE may assume that the reference signal will be periodically received in the RRC idle mode or the RRC inactive mode.

The PDCCH carrying the first DCI may be detected based on a paging-radio network temporary identifier (P-RNTI).

The first DCI may be a paging-DCI or specific DCI early indicating that the paging-DCI will be provided on a paging occasion (PO).

The specific DCI may include information on whether the paging-DCI about whether the paging-DCI includes information indicating the availability of the reference signal.

The specific DCI may indicate the availability of the reference signal for a specific time duration, wherein an end of the specific time duration may be related to a position of the PO.

The configuration for the reference signal may include information about a periodicity of the reference signal.

The configuration for the reference signal may be configuration through a system information block (SIB).

The configuration for the reference signal may be configuration in an RRC connected mode. The UE may receive the reference signal in the RRC idle mode or the RRC deactivation mode by maintaining the acquired configuration for the reference signal even when the UE enters the RRC idle mode or the RRC inactive mode.

The first DCI may indicate the availability of the reference signal by a short message field configured based on 3rd generation partnership project (3GPP).

The reference signal may include at least one of a channel state information-reference signal (CSI-RS) or a tracking reference signal (TRS).

Various descriptions, functions, procedures, proposals, methods, and/or operation flowcharts of the present disclosure may be applied to, but not limited to, various fields requiring wireless communication/connection (e.g., 5G) between devices.

Specific examples will be described in detail with reference to the drawings. In the following drawings/descriptions, the same reference numerals may denote the same or corresponding hardware blocks, software blocks, or functional blocks, unless otherwise indicated.

Figure 13:
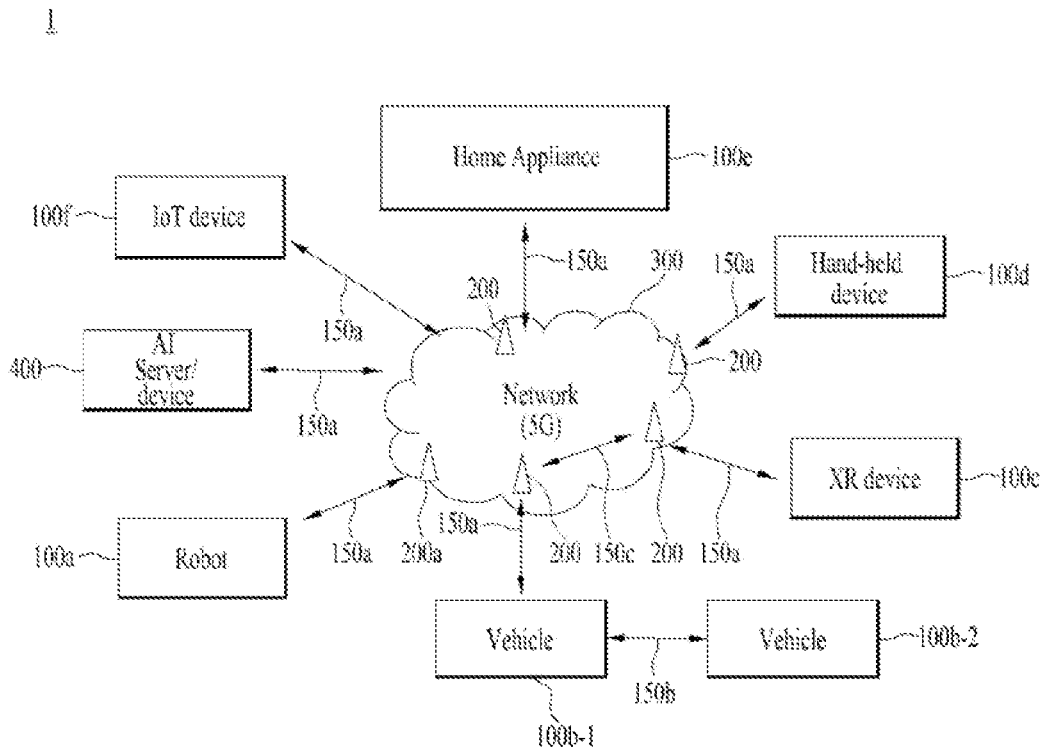
FIGS. 13 to 16 illustrate an example of a communication system 1 and wireless devices applicable to the present disclosure.

FIG. 13 illustrates a communication system 1 applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
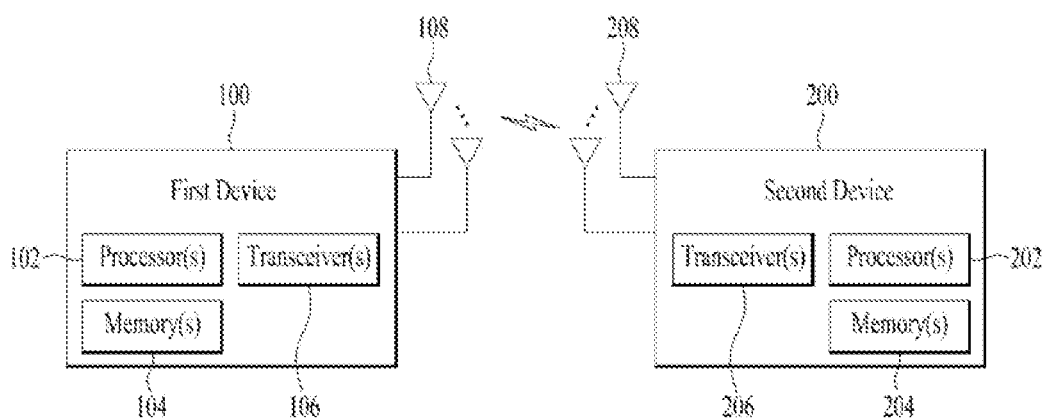

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In an embodiment of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In an embodiment of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
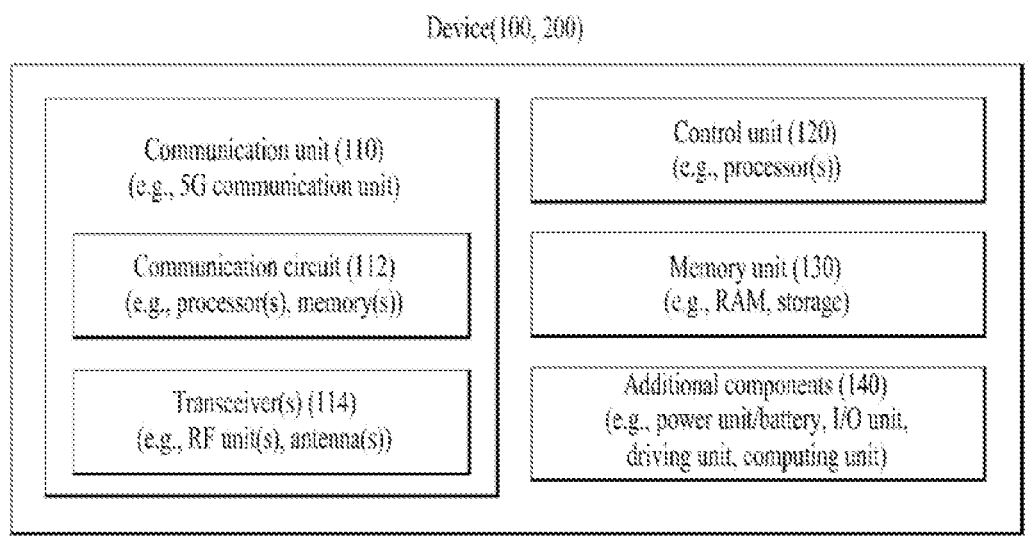

FIG. 15 illustrates another example of a wireless device applied to the present disclosure. The wireless device may be implemented in various forms according to a use-case/service (refer to FIG. 13).

Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 16:
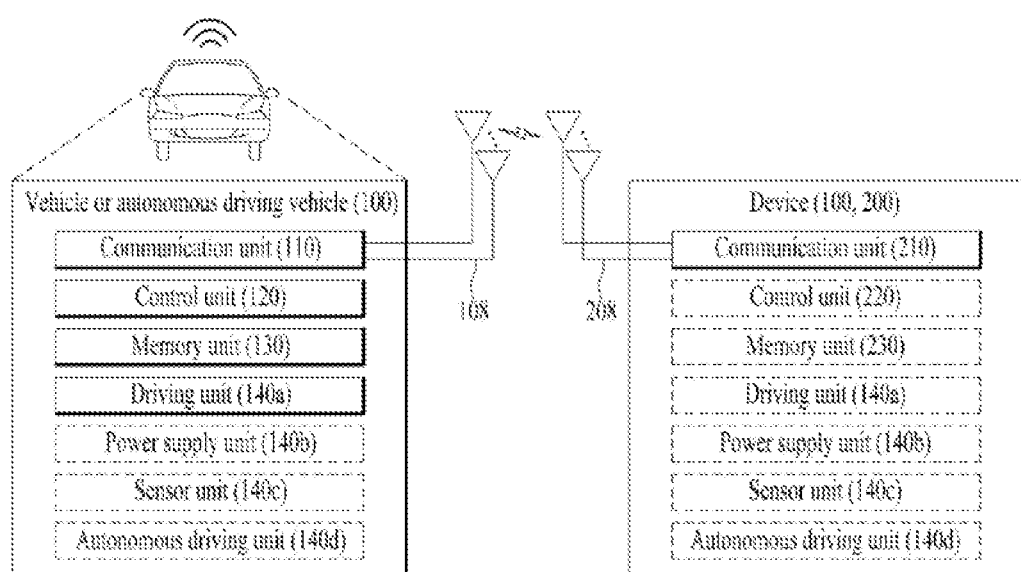

FIG. 16 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 16, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 17:
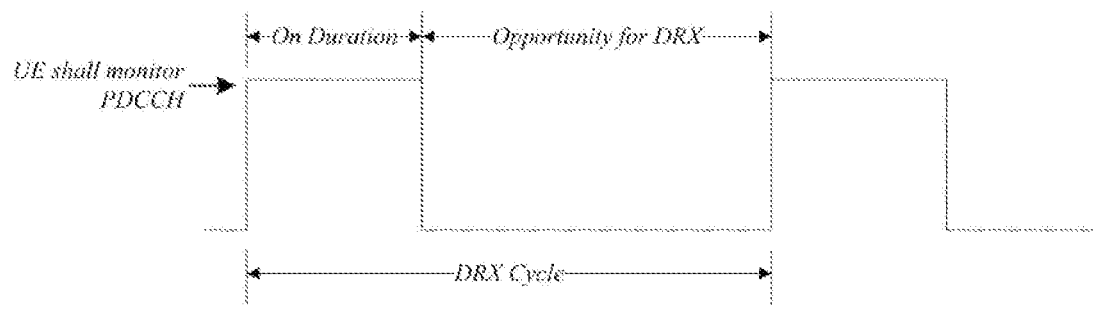
FIG. 17 illustrates an exemplary discontinuous reception (DRX) operation applicable to the present disclosure.

FIG. 17 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 17, a DRX cycle includes an On Duration and an Opportunity for DRX. The DRX cycle defines a time duration between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in an embodiment of the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in an embodiment of the present disclosure. Irrespective of whether DRX is configured, PDCCH monitoring may be restricted during a time period configured as a measurement gap.

Table 7 describes a DRX operation of a UE (in the RRC_CONNECTED state). Referring to Table 7, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 7

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

- Value of drx-OnDurationTimer: defines the duration of the starting period of the DRX cycle.
- Value of drx-InactivityTimer: defines the duration of a time period during which the UE is awake after a PDCCH occasion in which a PDCCH indicating initial UL or DL data has been detected
- Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, an embodiment may be configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method for receiving a signal by a terminal in a wireless communication system, the method comprising:
acquiring, through higher layer signaling, a configuration for a tracking reference signal (TRS) for a radio resource control (RRC) idle mode or an RRC inactive mode;
receiving downlink control information (DCI) carried by a physical downlink control channel (PDCCH) based on a paging-radio network temporary identifier (P-RNTI), in the RRC idle mode or in the RRC inactive mode;
and
receiving the TRS in the RRC idle mode or the RRC inactive mode based on availability indication information of the TRS included in the DCI and the acquired configuration for the TRS,
wherein the configuration for the TRS includes a periodicity and a slot offset of the TRS,
wherein the configuration includes information for a plurality of TRS resource sets each having a plurality of TRS resources,
wherein each of the plurality of TRS resource sets is allocated with an identifier (ID) to be used for the availability indication information,
wherein, for the plurality of TRS resource sets, the availability indication information indicates availability per each ID, and
wherein the availability indication information includes a plurality of bits associated with a plurality IDs of the plurality of TRS resource sets.

2. The method of claim 1, wherein the terminal obtains, based on the configuration for the TRS and the availability indication information of the TRS, information regarding a specific time duration in which the TRS can be configured.

3. The method of claim 1, wherein the availability of the TRS is indicated for a specific time duration.

4. The method of claim 3,
wherein an end of the specific time duration is related to a position of a paging occasion (PO) of the DCI.

5. The method of claim 1, wherein the configuration for the TRS is acquired through a system information block (SIB).

6. The method of claim 1, wherein the configuration for the TRS is acquired in an RRC connected mode,
wherein the terminal receives the TRS in the RRC idle mode or the RRC inactive mode by maintaining the acquired configuration for the TRS even when the terminal enters the RRC idle mode or the RRC inactive mode.

7. The method of claim 1, wherein the DCI indicates the availability of the TRS by a short message field configured based on 3rd generation partnership project (3GPP).

8. A non-transitory computer-readable recording medium having recorded thereon a program for carrying out the method of claim 1.

9. The method of claim 1, wherein the plurality of bits are configured to indicate the availability per each ID.

10. The method of claim 1, wherein the availability indication information is configured to represent availability of a corresponding TRS resource set and an ID of the corresponding TRS resource set.

11. A device for wireless communication, the device comprising:
a memory storing instructions;
a processor configured to execute the instructions to perform operations,
wherein the operations of the processor comprise:
acquiring, through higher layer signaling, a configuration for a tracking reference signal (TRS) for a radio resource control (RRC) idle mode or an RRC inactive mode;
receiving downlink control information (DCI) carried by a physical downlink control channel (PDCCH) based on a paging-radio network temporary identifier (P-RNTI), in the RRC idle mode or in the RRC inactive mode; and
receiving the TRS in the RRC idle mode or the RRC inactive mode based on availability indication information of the TRS included in the DCI and the acquired configuration for the TRS,
wherein the configuration for the TRS includes a periodicity and a slot offset of the TRS,
wherein the configuration includes information for a plurality of TRS resource sets each having a plurality of TRS resources,
wherein each of the plurality of TRS resource sets is allocated with an identifier (ID) to be used for the availability indication information, wherein, for the plurality of TRS resource sets, the availability indication information indicates availability per each ID, and wherein the availability indication information includes a plurality of bits associated with a plurality IDs of the plurality of TRS resource sets.

12. The device of claim 11, further comprising:

a transceiver, wherein the device is a user equipment (UE) in a wireless communication system.

13. A method for transmitting a signal by a base station in a wireless communication system, the method comprising:

transmitting, through higher layer signaling, a configuration for a tracking reference signal (TRS) for a terminal in a radio resource control (RRC) idle mode or an RRC inactive mode;

generating downlink control information (DCI) including availability indication information of the TRS;

transmitting, to the terminal in the RRC idle mode or the RRC inactive mode based on a paging-radio network temporary identifier (P-RNTI), a physical downlink control channel (PDCCH) including the DCI; and transmitting the TRS to the terminal in the RRC idle mode or the RRC inactive mode, based on the availability indication information of the TRS and the configuration for the TRS, wherein the configuration for the TRS includes a periodicity and a slot offset of the TRS, wherein the configuration includes information for a plurality of TRS resource sets each having a plurality of TRS resources, wherein each of the plurality of TRS resource sets is allocated with an identifier (ID) to be used for the availability indication information, wherein, for the plurality of TRS resource sets, the availability indication information indicates availability per each ID, and wherein the availability indication information includes a plurality of bits associated with a plurality IDs of the plurality of TRS resource sets.

14. A base station for transmitting a signal in a wireless communication system, the base station comprising:

a transceiver; and a processor configured to control the transceiver to:

transmit, through higher layer signaling, a configuration for a tracking reference signal (TRS) for a terminal in a radio resource control (RRC) idle mode or an RRC inactive mode;

generate downlink control information (DCI) including availability indication information of the TRS;

transmit, to the terminal in the RRC idle mode or the RRC inactive mode based on a paging-radio network temporary identifier (P-RNTI), a physical downlink control channel (PDCCH) including the DCI; and transmit the TRS to the terminal in the RRC idle mode or the RRC inactive mode, based on the availability indication information of the TRS and the configuration for the TRS, wherein the configuration for the TRS includes a periodicity and a slot offset of the TRS, wherein the configuration includes information for a plurality of TRS resource sets each having a plurality of TRS resources, wherein each of the plurality of TRS resource sets is allocated with an identifier (ID) to be used for the availability indication information, wherein, for the plurality of TRS resource sets, the availability indication information indicates availability per each ID and wherein the availability indication information includes a plurality of bits associated with a plurality IDs of the plurality of TRS resource sets.

\* \* \* \* \*